(12) United States Patent
Richards et al.

(10) Patent No.: US 7,498,648 B2
(45) Date of Patent: Mar. 3, 2009

(54) MIRROR-BASED PROJECTION SYSTEM WITH A PROGRAMMABLE CONTROL UNIT FOR CONTROLLING A SPATIAL LIGHT MODULATOR

(75) Inventors: Peter Richards, San Francisco, CA (US); Andrew Huibers, Palo Alto, CA (US); Satyadev Patel, Palo Alto, CA (US)

(73) Assignee: Texas Instruments Incorporated, Dallas, TX (US)

( * ) Notice: Subject to any disclaimer, the term of this patent is extended or adjusted under 35 U.S.C. 154(b) by 343 days.

(21) Appl. No.: 11/332,594

(22) Filed: Jan. 12, 2006

(65) Prior Publication Data

US 2006/0175622 A1 Aug. 10, 2006

Related U.S. Application Data

(63) Continuation-in-part of application No. 10/627,155, filed on Jul. 24, 2003, now Pat. No. 7,019,376.

(51) Int. Cl.
*G09G 3/34* (2006.01)

(52) U.S. Cl. ............... 257/436; 257/E33.072; 345/31; 345/84; 359/291; 438/66

(58) Field of Classification Search .......... 257/E33.072; 345/31
See application file for complete search history.

(56) References Cited

U.S. PATENT DOCUMENTS

| 6,945,712 B1* | 9/2005 | Conn ............... 385/94 |
| 7,315,294 B2* | 1/2008 | Richards ............ 345/84 |
| 2005/0146540 A1* | 7/2005 | Marshall et al. ...... 345/698 |
| 2005/0213188 A1* | 9/2005 | DeSimone et al. ..... 359/290 |
| 2006/0250587 A1* | 11/2006 | Grasser et al. ........ 353/99 |
| 2007/0273703 A1* | 11/2007 | Rumreich ............ 345/581 |

* cited by examiner

*Primary Examiner*—Stephen W Smoot
(74) *Attorney, Agent, or Firm*—Wade James Brady, III; Frederick J. Telecky, Jr.

(57) ABSTRACT

A projection system is disclosed herein. The projection system employs a spatial light modulator comprising an array of individually addressable pixels for modulating the incident light based on image data. The modulated light is projected on a screen for viewing.

61 Claims, 13 Drawing Sheets

MIRROR-BASED PROJECTION SYSTEM WITH A PROGRAMMABLE CONTROL UNIT FOR CONTROLLING A SPATIAL LIGHT MODULATOR

CROSS-REFERENCE TO RELATED CASES

This patent application is a continuation-in-part of U.S. patent application Ser. No. 10/627,155 filed Jul. 24, 2003, and issued as U.S. Pat. No. 7,019,376, the subject matter being incorporated herein by reference.

The subject matter of the following US patents and patent applications are incorporated herein by reference in entirety:

| | |
|---|---|
| Ser. No.: 10/407,061 | filed: Apr. 2, 2003 |
| Ser. No.: 10/607,687 | filed: Jun. 27, 2003 |
| Ser. No.: 10/648,608 | field: Aug. 25, 2003 |
| Ser. No.: 10/648,689 | filed: Aug. 25, 2003 |
| Ser. No.: 10/698,290 | filed: Oct. 30, 2003 |
| Ser. No.: 10/607,687 | filed: Jun. 27, 2003 |
| Ser. No.: 10/982,259 | filed: Nov. 5, 2004 |
| Ser. No.: 11/069,408 | filed: Feb. 28, 2005 |
| Ser. No.: 11/128,607 | filed: May 13, 2005 |

TECHNICAL FIELD OF THE INVENTION

The present invention is related generally to the art of projection systems, and more particularly, to micromirror-based projection systems.

SUMMARY OF THE INVENTION

The present invention provides a micromirror-based projection system that includes, but is not limited to, rear-projection systems, front projections systems, and other display systems. The projections system employs one or more spatial light modulators each of which comprises an array of reflective and deflectable mirror plates. Each mirror plate is coupled to an addressing electrode such that the mirror plate can be electrostatically deflected. The addressing electrodes are connected to voltage output nodes of an array of memory cells. The memory cells can be SRAM, DRAM, or charge-pump cells. A charge-pump cell is a cell that comprises a CMOS transistor and capacitor. The source of the transistor is connected to a bitline, the gate of the transistor is connected to a bitline, and the drain of the transistor is connected to one of the plate of the capacitor—forming a voltage output node to which an addressing electrode is connected. The other plate of the capacitor is connected to a pumping signal whose voltage varies over time during the operation.

The array of memory cells are driven by a set of bitlines and wordlines. In an exemplary configuration, the wordlines are connected to the memory cells such that at least two memory cells of a row of the memory cell array are coupled to separate word-lines of the plurality of word-lines. Specifically, each row of the memory cell array is divided into memory cell groups with each group comprising one or more memory cells. The memory cells of the same group are connected to the same wordline; while the memory cells of different groups in the same row are connected to separate wordlines. With such configuration, the memory cells of the row can be activated independently. In the application of display systems, the multi-wordline configuration is capable of removing unwanted and annoying artificial effects such as the dynamic-false-contour that often occurs in the art. The above multi-wordline configuration can be extended to the entire memory cell array so as to selectively activating memory cells independently in a location of the array. For example, the memory cells across the entire array can be divided into groups according to their activation scheme. By connecting the memory cells in the same group to a set of wordlines that are capable of being activated concurrently; and the memory cells in different groups to another set of wordlines, the memory cells in the entire array can be activated independently as desired.

In operation, the states (voltages) of the memory cells are written by the wordlines and bitlines according to a stream o image data derived from the desired images or videos. Image data generation and delivery are controlled by a controller of the projection system. In particular, operations on the image data are preferably synchronized with the operations of other members of the projection system, such as the arc lamp and color filter (e.g. color wheel). These control operations can be accomplished by the controller of the system. Specifically, the controller comprises a plurality of functional modules designated for accomplishing the above controlling operations. The functional modules can be implemented in a Field-Programmable-Gate-Array (FPGA) logic cells, such as Xilinx SRAM-based FPGA embedded in the controller.

The mirror plates each have a characteristic dimension in the order of microns, such as 100 micros or less, 50 microns or less, and 15 microns or less. The mirror plates are arranged in arrays preferably with a pitch of 10.16 microns or less, such as from 4.38 to 10.16 microns. The gap between the adjacent mirror plates is preferably 1.5 microns or less, such as 1 micron or less, 0.5 micron or less, more preferably from 0.1 to 0.5 micron. The mirror plate array preferably has a diagonal from 0.45 to 0.9 micron, such as from 0.55 to 0.8 micron. The total number of mirror plates, which is referred to as the natural resolution of the array, is preferably 640×480 (VGA) or higher, such as 800×600 (SVGA) or higher, 1024×768 (XGA) or higher, 1280×1024 (SXGA) or higher, 1280×720 or higher, 1400×1050 or higher, 1600×1200 (UXGA) or higher, and 1920×1080 or higher.

In operation, the spatial light modulator modulates a beam of incident light according to a stream of image data derived from desired images or video contents. The incident light beam can be provided by an illumination system that comprises an arc lamp or one or more LEDs. When an arc lamp is used, then arc lamp preferably has an arc length of 1.6 mm or less, such as 1.3 mm or less, 1.0 mm or less, and 0.7 mm or less. The power of the arc lamp is preferably from 100 watts to 250 watts.

More preferably, the illumination system comprises a LED. In particular, one or more LEDs emitting white color can be used for producing the light beam for the system. Alternatively, one or more LEDs of certain wavebands, such as red, green, and blue can be provided for producing the light beam. In accordance with an embodiment of the invention, an array of juxtaposed LEDs is provided in the illumination system. The LED array comprises sub-arrays of LEDs wherein the LEDs of the same sub-array provides a light beam of certain color and bandwidth; and the LEDs of different sub-arrays produces different colors. Specifically, the LEDs in the same sub-array may have slightly different (e.g. <10 nm) characteristic wavelengths. By juxtaposing the LEDs, the characteristic wavelengths are overlapped, resulting in a profile with desired waveband.

In addition to the light source, the illumination system may comprise other components, such as an optical integrator, a color wheel that may not be necessary when a LED is employed as the light source, and condensing optics that directs the illumination light beam onto the mirror plates. The modulated light beams are collected and projected onto a screen by projection optics.

In one example of the invention, a projection system comprises: an illumination system providing light; a spatial light modulator comprising an array of reflective and deflectable mirror plates for modulating the light; a control unit composed of a field-programmable-gate-array for controlling the spatial light modulator in modulating the light, wherein an application-specific-integrated-circuit is absent from the control unit; a data conversion module designated for converting a set of image data into a set of bitplane data, said module being implemented in the field-programmable-gate-array through a set of configuration data such that the field-programmable-gate-array is capable to output the bitplane data to the spatial light modulator; and a projection lens for projecting the modulated light; and a screen on which the modulated light is projected.

In another example of the invention, a method, comprises: receiving a spatial light modulator and a control unit associated with the spatial light modulator for controlling the spatial light modulator; wherein the spatial light modulator comprises an array of reflective micromirror devices capable of modulating light; wherein the control unit is composed of a field-programmable-gate-array and lacks of an application-specific-integrated-circuit; and wherein the control unit comprises a data conversion module designated for converting a set of image data into a set of bitplane data, said module being implemented in the field-programmable-gate-array through a set of configuration data such that the field-programmable-gate-array is capable to output the bitplane data to the spatial light modulator; and building a projection system using the received spatial light modulator and control unit, further comprising: modifying the set of data so as to modify the default configuration of the received control unit according to a desired specific configuration; and delivering the projection system to an end user.

In yet another example of the invention, a projection system comprises: a light-emitting-diode (LED) providing light; a spatial light modulator comprising an array of micromirror devices, each of which comprises a deflectable and reflective mirror plate associated with an addressing electrode for electrostatically moving the mirror plate; a control unit composed of a field-programmable-gate-array configured so as to be able to control the spatial light modulator in an operation; and an optical element for projecting the modulated light on a screen.

In still yet another example of the invention, a projection system comprises: an illumination system providing light; a reflective spatial light modulator on which light from the light source is incident, the spatial light modulator comprising; means for modulating pixels of the spatial light modulator such that pixels in an ON state direct light as a first pixel pattern via projection optics onto a target, wherein the intensity vs. distance across a row of projected pixels on the target at a particular time T1, FWHM, defined as the full width at half maximum of an intensity peak for a particular pixel, is less than 70% of the pitch, wherein the pitch is defined as the distance between adjacent intensity peaks; a control unit composed of a field-programmable-gate-array implemented therein a plurality of functional modules for controlling the illumination system and array of micromirror devices; and an optical element for projecting the modulated light on a screen.

In still yet another example of the invention, a method comprises: fabricating a spatial light modulator and a control unit associated with the spatial light modulator for controlling the spatial light modulator; wherein the spatial light modulator comprises an array of reflective micromirror devices capable of modulating light; wherein the control unit is composed of a field-programmable-gate-array and lacks of an application-specific-integrated-circuit; and wherein the control unit comprises a data conversion module designated for converting a set of image data into a set of bitplane data, said module being implemented in the field-programmable-gate-array through a set of configuration data such that the field-programmable-gate-array is capable to output the bitplane data to the spatial light modulator; and delivering the fabricated spatial light modulator and control unit to a customer for building a projection system, further comprising: providing to the customer an access to the pre-programmed configuration so as to allow the customer to modify the field-programmable-gate-array.

In still yet another example of the invention, a projection system comprises: an illumination system capable of producing light; a spatial light modulator comprising an array of reflective and deflectable mirror plates for modulating the light based on a sequence of bitplane data that is derived from a desired image; means for converting the desired image to the sequence of bitplane data with a programmed field-programmable-gate-array; and a screen wherein the modulated light is projected so as to produce the desired image.

In yet another example of the invention, a method for displaying a desired image with a spatial light modulator comprising an array of micromirror devices is disclosed. The method comprises: directing light to the spatial light modulator; deriving a sequence of bitplane data from the desired image using a pre-programmed field-programmable-gate-array; modulating the light by the spatial light modulator according to the sequence of bitplane data; and projecting the modulated light onto a screen.

In yet another example of the invention, a method comprises: making a spatial light modulator and a control unit, said spatial light modulator comprising an array of reflective and deflectable micromirror devices; and said control unit comprising a set of programmable codes for controlling the spatial light modulator in an operation; and providing to a customer an access to the set of programmable codes such that the customer is capable of modifying the codes according a specific configuration; and delivering the spatial light modulator and the control unit to the customer.

In yet another example of the invention, a projection system comprises: an illumination system producing light; a spatial light modulator optically coupled to the light for modulating the light; a control unit for controlling the modulation of the spatial light modulator, wherein the control unit comprises a field-programmable-gate-array programmed such that an output of the field-programmable-gate-array comprises a set of bitplane data directly usable by the spatial light modulator for producing an image; and a screen on which the modulated light is projected so as to form the desired image.

Objects and advantages of the present invention will be obvious, and in part appear hereafter and are accomplished by the present invention that provides a method and apparatus for operating pixels of spatial light modulators in display systems. Such objects of the invention are achieved in the features of the independent claims attached hereto. Preferred embodiments are characterized in the dependent claims. In the claims, only elements denoted by the words "means for"

are intended to be interpreted as means plus function claims under 35 U.S.C. §112, the sixth paragraph.

BRIEF DESCRIPTION OF DRAWINGS

While the appended claims set forth the features of the present invention with particularity, the invention, together with its objects and advantages, may be best understood from the following detailed description taken in conjunction with the accompanying drawings of which:

DETAILED DESCRIPTION OF THE EMBODIMENTS

The invention discloses a projection system that comprises an illumination system, a spatial light modulator with an array of micromirror devices, a control unit, and a set of optics. The illumination system preferably comprises one or more LEDs for providing illumination light beams for the system. The spatial light modulator modulates the light beam in accordance with a stream of image data derived from the desired images or videos. The modulated light beams are collected and projected by the optics onto a screen.

The spatial light modulator comprises an array of deflectable and reflective mirror plates each of which is associated with an addressing electrode. The electrodes are connected to an array of memory cells whose voltages are determined by a stream of image data derived from the desired images or videos. For writing the image data to the memory cells, the memory cells are connected to a set of wordline and bitlines. In an exemplary configuration, the memory cells of each row of the memory cell array are connected to and thus activated by multiple wordlines such that the memory cells of the row can be activated independently.

The components of the display system are operated and controlled by a control unit with build-in Field-Programmable-Gate-Array (FPGA). Specifically, the program modules used in operating and controlling the components of the display system are implemented in the FPGA. The projection system of the present invention can be any types of display systems employing micromirror-based spatial light modulators, such as rear projection systems and front projection systems.

In the following, the present invention will be discussed with reference to specific examples. It will be appreciated by those skilled in the art that the following discussion is for demonstration purposes only; and should not be interpreted as a limitation. Instead, any variations without departing from the spirit of the invention are applicable.

Projection Systems Using ARC Lamps or LEDS

Figure 1:
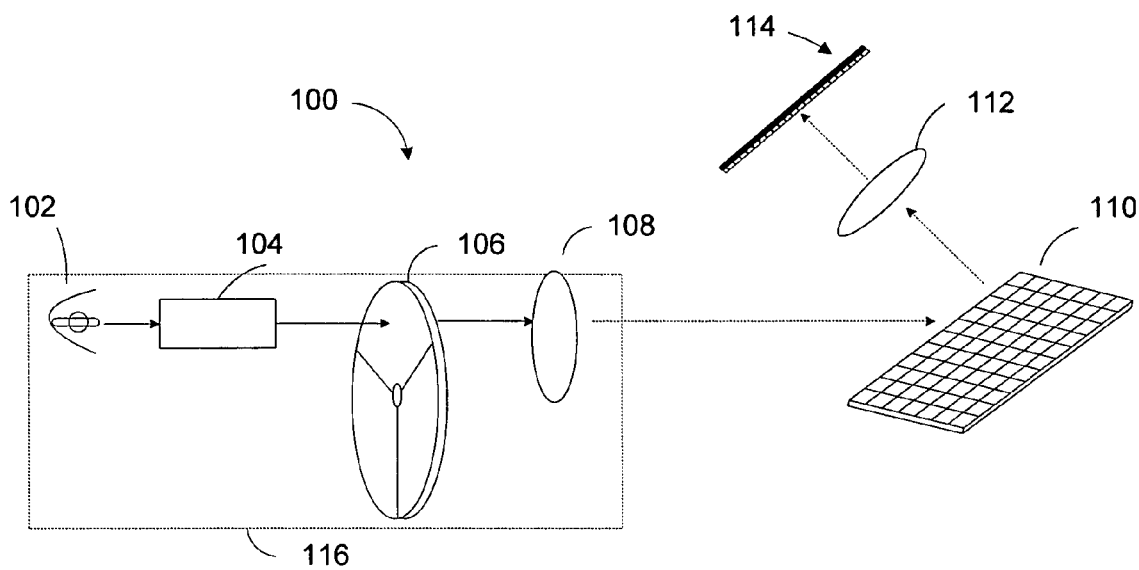
FIG. 1 diagrammatically illustrates an exemplary display system in which embodiments of the invention can be implemented.

Turning to the drawings, FIG. 1 demonstratively illustrates an exemplary display system in which embodiments of the invention can be implemented. In this particular example, display system 100 comprises light source illumination system 116, group lens 108, spatial light modulator 110, projection lens 112, and display target 114. The illumination system may further comprise light source 102, light pipe 104, and color filter 106 such as a color wheel. Alternative to the illumination system 116 as shown in the figure wherein the color wheel is positioned after the light pipe along the propagation path of the illumination light from the light source, the color wheel can also be positioned between the light source and light pipe at the propagation path of the illumination light. The illumination light can be polarized or non-polarized. When polarized illumination light is used, display target 114 may comprise a polarization filter associated with the polarized illumination light, as set forth in U.S. provisional patent application Ser. No. 60/577,422 filed Jun. 4, 2004, the subject matter being incorporated herein by reference.

The light source can be any suitable light source, such as an arc lamp, preferably an arc lamp with a short arc for obtaining intensive illumination light. The light source can also be an arc lamp with a spiral reflector, as set forth in U.S. patent application Ser. No. 11/055,654 filed Feb. 9, 2005, the subject matter being incorporated herein by reference. Alternatively, the light source can be light-emission-diodes (LEDs), which will be detailed afterwards with reference to FIG. 3 and FIG. 4.

The lightpipe (104) can be a standard lightpipe that are widely used in digital display systems for delivering homogenized light from the light source to spatial light modulators. Alternatively, the lightpipe can be the one with movable reflective surfaces, as set forth in U.S. patent provisional application Ser. No. 60/620,395 filed Oct. 19, 2004, the subject matter being incorporated herein by reference.

The color wheel (106) comprises a set of color and/or white segments, such as red, green, blue, or yellow, cyan, and magenta. The color wheel may further comprise a clear or non-clear segment, such as a high throughput or white segment for achieving particular purposes, as set forth in U.S. patent application Ser. No. 10/899,637, and Ser. No. 10/899,635 both filed Jul. 26, 2004, the subject matter of each being incorporated herein by reference, which will not be discussed in detail herein.

It is noted that the color wheel and lightpipe may not be necessary, especially when a LED is employed as the light source.

Figure 2:
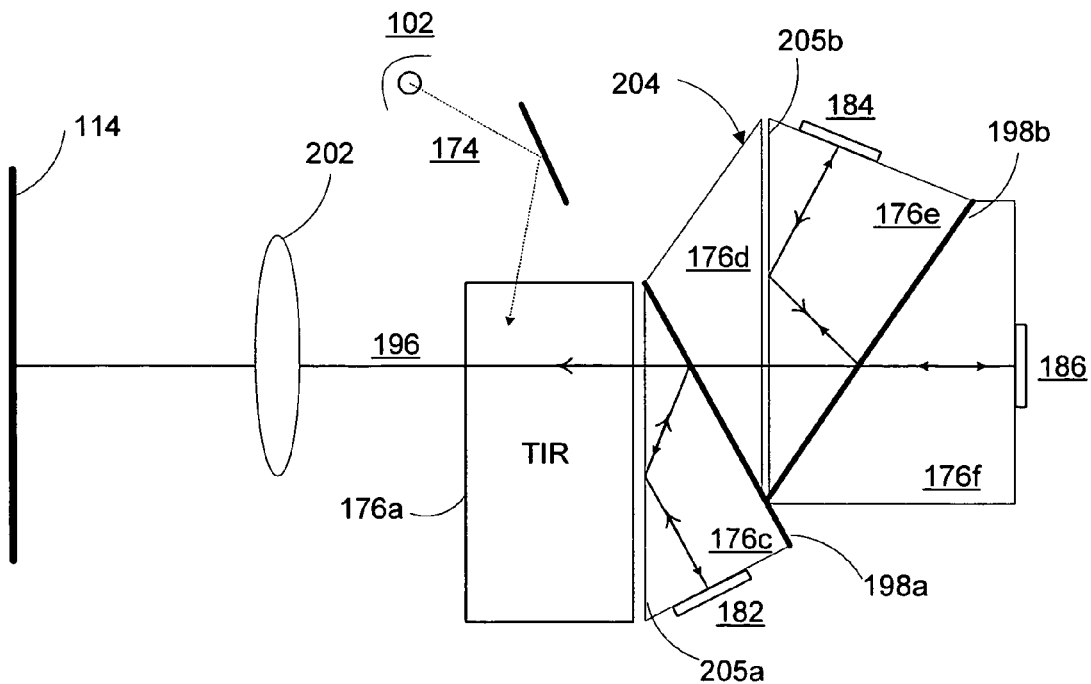
FIG. 2 diagrammatically illustrates another exemplary display system in which embodiments of the invention can be implemented.

The display system in FIG. 1 employs one spatial light modulator. However, a display system may use multiple spatial light modulators for modulating the illumination light of different colors. One of such display systems is schematically illustrated in FIG. 2. Referring to FIG. 2, the display system uses a dichroic prism assembly 204 for splitting incident light into three primary color light beams. Dichroic prism assembly comprises TIR 176a, 176c, 176d, 176e and 176f. Totally-internally-reflection (TIR) surfaces, i.e. TIR surfaces 205a and 205b, are defined at the prism surfaces that face air gaps. The surfaces 198a and 198b of prisms 176c and 176e are coated with dichroic films, yielding dichroic surfaces. In particular, dichroic surface 198a reflects green light and transmits other light. Dichroic surface 198b reflects red light and transmits other light. The three spatial light modulators, 182, 184 and 186, each having a micromirror array device, are arranged around the prism assembly.

In operation, incident white light 174 from light source 102 enters into TIR 176a and is directed towards spatial light modulator 186, which is designated for modulating the blue light component of the incident white light. At the dichroic surface 198a, the green light component of the totally internally reflected light from TIR surface 205a is separated therefrom and reflected towards spatial light modulator 182, which is designated for modulating green light. As seen, the separated green light may experience TIR by TIR surface 205b in order to illuminate spatial light modulator 182 at a desired angle. This can be accomplished by arranging the incident angle of the separated green light onto TIR surface 205b larger than the critical TIR angle of TIR surface 205b. The rest of the light components, other than the green light, of the reflected light from the TIR surface 205a pass through dichroic surface 198a and are reflected at dichroic surface 198b. Because dichroic surface 198b is designated for reflecting red light component, the red light component of the incident light onto dichroic surface 198b is thus separated and reflected onto spatial light modulator 184, which is designated for modulating red light. Finally, the blue component of the white incident light (white light 174) reaches spatial light modulator 186 and is modulated thereby. By collaborating operations of the three spatial light modulators, red, green, and blue lights can be properly modulated. The modulated red, green, and blue lights are recollected and delivered onto display target 114 through optic elements, such as projection lens 202, if necessary.

As mentioned earlier, an LED can be used in the display system as the light source for providing illumination light beams due to many advantages, such as compact size, longer lifetime than arc lamps, lower heating than arc lamps, and narrower bandwidth than arc lamps. As an example, gallium nitride light emitting diodes can be used for the green and blue arrays, and gallium arsenide (aluminum gallium arsenide) could be used for the red light emitting diode array. LEDs such as available or disclosed by Nichia™ or Lumileds™ could be used, or any other suitable light emitting diodes. Some of the current LEDs have a lifetime of 100,000 hours or more, which is almost 10 times higher than the lifetime of the current UHP arc lamp with the longest lifetime. LEDs are cold light source, which yields much less heat than arc lamps. Even using multiple LEDs in a display system, the total heat generated by the LEDs can be dissipated much easier than using the arc lamps, because the heat generated by the LEDs is omni-directional as compared to the heat generated by the arc lamps wherein the heat has preferred orientations. Currently, LEDs of different colors have been developed. When multiple LEDs of different colors, such as red, green, and blue, are concurrently employed in the display system, beam splitting elements, such as a color wheel, that are required for the arc lamp, can be omitted. Without light splitting elements, system design and manufacturing can be significantly simplified. Moreover, the display system can be made more compact and portable.

As compared to current arc lamps, LEDs are also superior in spectrum to arc lamps. The spectrum of a LED has a typical width of 10 nm to 35 nm. However, the typical spectrum width of the colors (e.g. red, green, and blue) derived from the color wheel used in combination with an arc lamp is approximately 70 nm, which is much larger than that of the LED. In other words, LEDs have much purer colors than arc lamps, resulting in more abundant colors than arc lamps.

Like arc lamps, LEDs may have the color balance problem, wherein different colors may have different intensities. This problem for LEDs, however, can be solved simply by time-mixing or spatial-mixing mode. In spatial-mixing mode, different number of LEDs for different colors can be provided for balancing the intensity discrepancies in different colors. In time-mixing mode, the color can be balanced by tuning the ON-time ratio of different LEDs for different colors, which will be detailed with reference to FIG. 4.

To be commensurate with the display system, the LEDs used in the projection system preferably have a light flux of 3 lumens or higher, such as 4.4 lumens or higher, and 11.5 lumens or higher.

Using multiple LEDs of different colors has other practical benefits as compared to using the arc lamp and color wheel. In the display system using the arc lamp and color wheel, color transition unavoidably occurs as the color wheel spins and color fields in the color wheel sequentially sweeps across the micromirror array of the spatial light modulator. The color transition cast extra design for the system, which complicate the system. Moreover, color transition reduces optical efficiency of the system, for example, a portion of the incident light has to be sacrificed. As a comparison, LEDs may not have the color transition problem. Regardless whether the LEDs sequentially or concurrently illuminating the micromirror devices of the spatial light modulator, all micromirror devices of the spatial light modulator can be illuminated by a light beam of specific color at a time.

Figure 3:
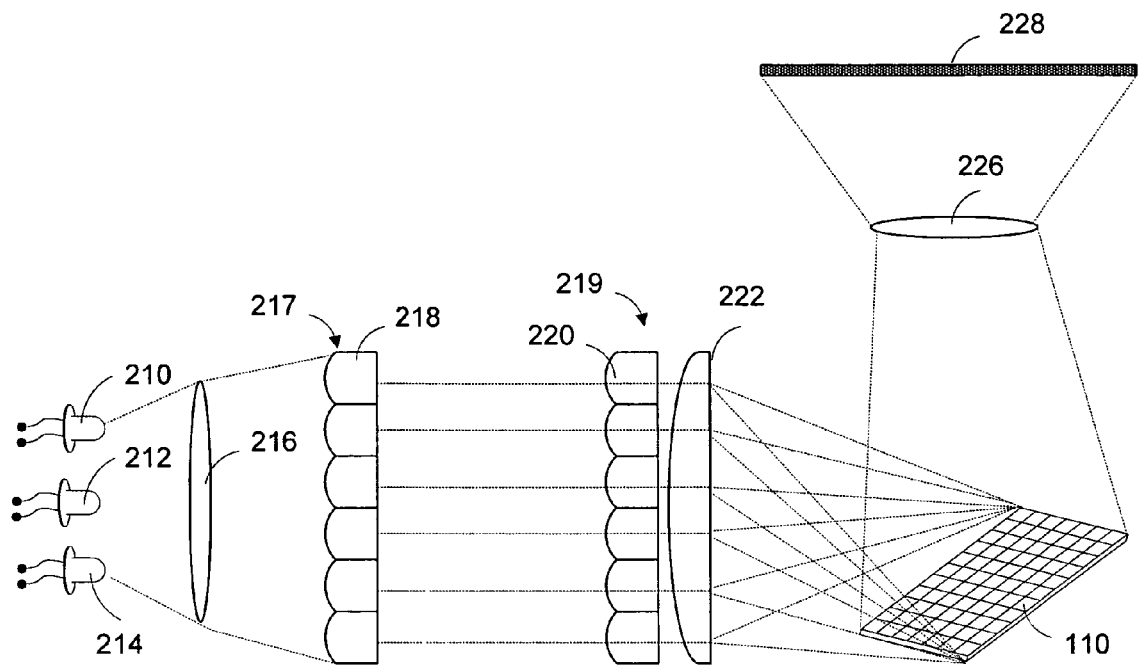
FIG. 3 diagrammatically illustrates yet another exemplary display system in which embodiments of the invention can be implemented.

Referring to FIG. 3, an exemplary display system using LEDs as light source is demonstratively illustrated therein. In this example, the projection system comprises a LED array (e.g. LEDs 210, 212, and 214) for providing illumination light beam for the system. For demonstration purposes only, three LEDs are illustrated in the figure. In practice, the LED group may have any suitable number of LEDs, including a single LED. The LEDs can be of the same color (e.g. white color) or different colors (e.g. red, green, and blue). The light beams from the LED array are projected onto front fly-eye lens 217 through collimation lens 216. Fly-eye lens 217 comprises multiple unit lenses such as unit lens 218. The unit lenses on fly-eye lens 217 can be cubical lens or any other suitable lenses, and the total number of the unit lenses in the fly-eye lens 217 can be any desired numbers. At fly-eye lens 218, the light beam from each of the LEDs 210, 212, and 214 is split into a number of sub-light beams with the total number being equal to the total number of unit lenses of fly-eye lens 218. After collimation lens 216 and fly-eye lens 217, each LEDs 210, 214, and 216 is imaged onto each unit lens (e.g. unit lens 220) of rear fly-eye lens 219. Rear fly-eye lens 219 comprises a plurality of unit lenses each of which corresponds to one of the unit lenses of the front fly-eye lens 217, such that each of the LEDs forms an image at each unit lens of the rear fly-eye lens 219. Projection lens 222 projects the light beams from each unit lens of fly-eye lens 219 onto spatial light modulator 110.

With the above optical configuration, the light beams from the LEDs (e.g. LEDs 210, 212, and 214) can be uniformly projected onto the micromirror devices of the spatial light modulator.

In the display system, a single LED can be used, in which instance, the LED preferably provides white color. Alternatively, an array of LEDs capable of emitting the same (e.g. white) or different colors (e.g. red, green, and blue) can be employed. Especially when multiple LEDs are employed for producing different colors, each color can be produced by one or more LEDs. In practical operation, it may be desired that different colors have approximately the same or specific characteristic spectrum widths. It may also be desired that different colors have the same illumination intensity. These requirements can be satisfied by juxtaposing certain number of LEDs with slightly different spectrums, as demonstratively shown in FIG. 4.

Figure 4:
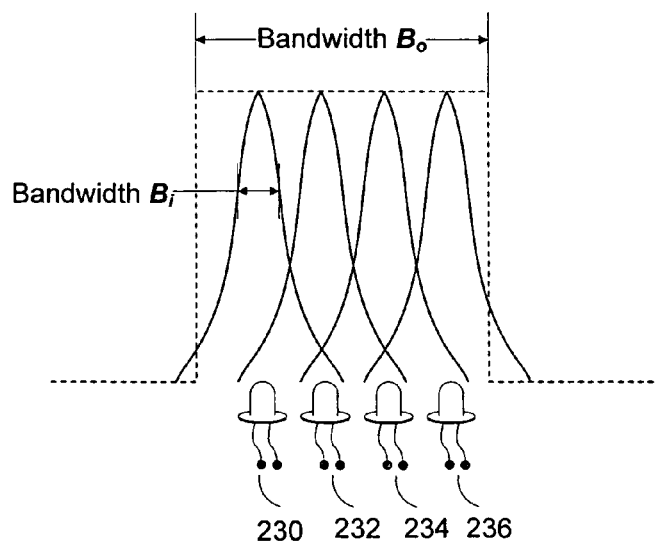
FIG. 4 demonstratively illustrates an array of LEDs used as the light source in the projection system in FIG. 3.

Referring to FIG. 4, it is assumed that the desired spectrum bandwidth of a specific color (e.g. red) is $B_o$ (e.g. a value from 10 nm to 80 nm, or from 60 nm to 70 nm), and the characteristic spectrum bandwidth of each LED (e.g. LEDs 230, 232, 234, and 236) is $B_i$ (e.g. a value from 10 nm to 35 nm). By properly selecting the number of LEDs with suitable spectrum differences, the desired spectrum can be obtained. As a way of example, assuming that the red color with the wavelength of 660 nm and spectrum bandwidth of 60 nm is desired, LEDs 230, 232, 234, and 236 can be selected and juxtaposed as shown in the figure. LED 230, 232, 234, and 236 may have characteristic spectrum of 660 nm, 665 nm, 670 nm, and 675 nm, and the characteristic spectrum width of each LED is approximately 10 nm. As a result, the effective spectrum width of the juxtaposed LEDs can approximately be the desired red color with the desired spectrum width.

Different LEDs emitting different colors may exhibit different intensities, in which instance, the color balance is desired so as to generate different colors of the same intensity. An approach is to adjust the ratio of the total number of LEDs for the different colors to be balanced according to the ratio of the intensities of the different colors, such that the effective output intensities of different colors are approximately the same.

In the display system wherein LEDs are provided for illuminating a single spatial light modulator with different colors, the different colors can be sequentially directed to the spatial light modulator. For this purpose, the LEDs for different colors can be sequentially turned on, and the LEDs for the same color are turned on concurrently. In another system, multiple spatial light modulators can be used as set froth in US patent application "Multiple Spatial Light Modulators in a Package" to Huibers, filed Aug. 30, 2005, the subject matter being incorporated herein by reference in entirety. A group of LEDs can be employed in such a display system for producing different colors that sequentially or concurrently illuminate the multiple spatial light modulators, as demonstrated in FIG. 5.

Figure 5:
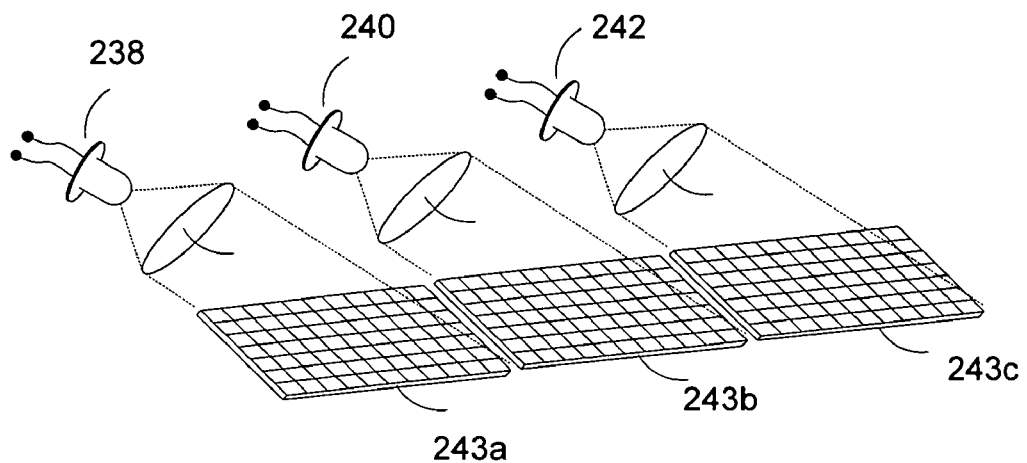
FIG. 5 demonstratively illustrates another example of using an array of LEDs as the light source for illuminating multiple spatial light modulators employed concurrently in a display system.

Referring to FIG. 5, LEDs 238, 240, and 242, emitting different colors, such as red, green, and blue, are used for illuminating spatial light modulators 243a, 243b, and 243c, respectively. The illumination can be sequential or concurrent. For sequentially illuminating the multiple spatial light modulators, the LEDs emitting the same color are turned on at the same time, while the groups of LEDs emitting different colors are turned on sequentially. For concurrently illuminating the multiple spatial light modulators with different colors, different groups of LEDs emitting different colors can be turned on concurrently. The multiple spatial light modulators respectively modulate the different colors. The modulated different colors are then integrated so as to form the desired color images or videos.

In addition to the display system as discussed above, the invention can be implemented in other projection systems, as set forth in U.S. patent application Ser. No. 60/678,617 filed May 5, 2005, the subject matter being incorporated herein by reference in its entirety.

Spatial Light Modulators of Small Dimensions

Figure 6:
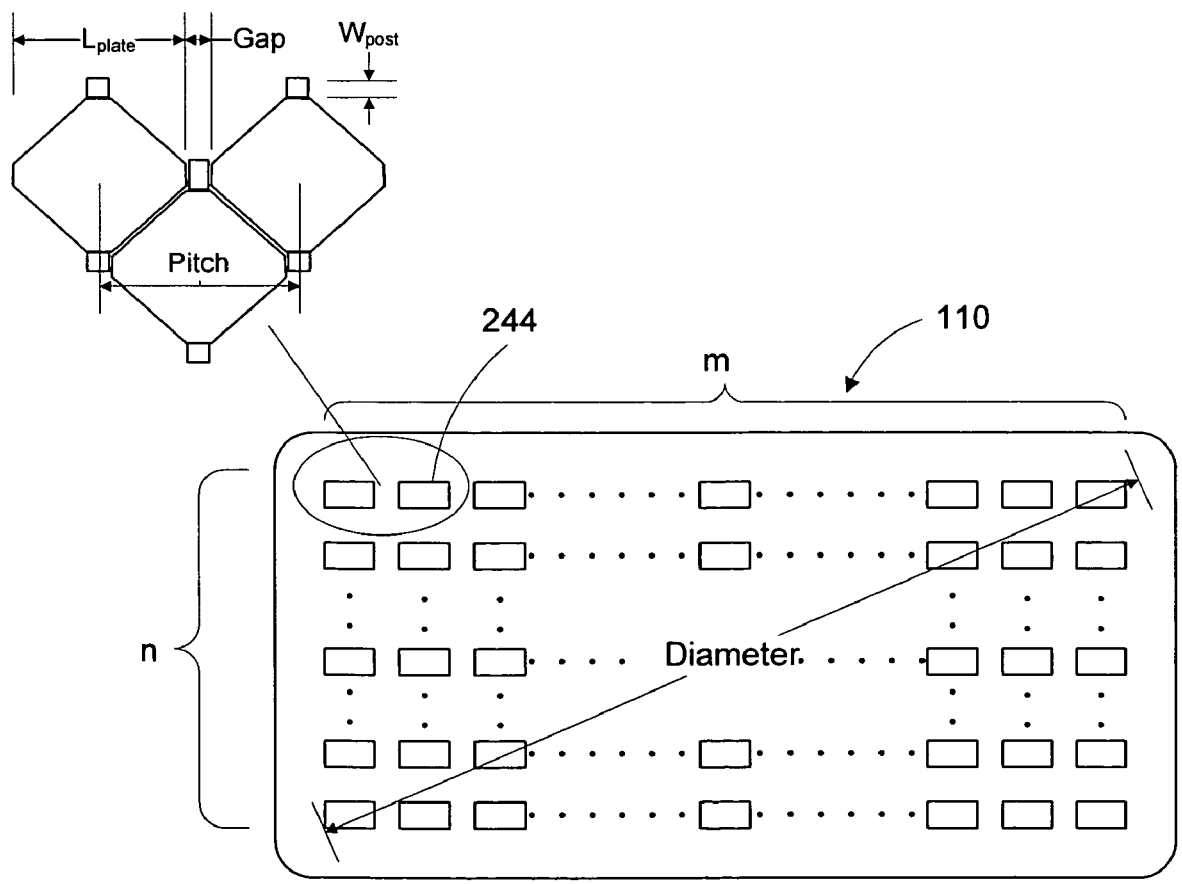
FIG. 6 schematically illustrates a top view of a spatial light modulator.

The spatial light modulators of the display systems in FIGS. 1 to 5 each comprise an array of micromirror devices each of which has a reflective and deflectable mirror plate. The dimension of the micromirror array and the spatial light modulator is defined with reference FIG. 6. Spatial light modulator 110 comprises an array of micromirror devices that has m×n micromirror devices (e.g. micromirror device 244), wherein m and n respectively represent the number of micromirror devices in a row and a column of the array. The micromirror array also has a well defined diagonal, which is generally measured in inches. As shown in the insert figure, a gap and pitch is defined by two adjacent micromirror devices. $L_{plate}$ measures the size of the micromirror device, and $W_{post}$ measures the post area of the micromirror device. The post area is the area in which posts (e.g. post 256 in FIG. 9, and 272 in FIG. 10) for holding the mirror plate are formed. Though the insert figure illustrates the dimensions of the micromirror and the adjacent micromirrors with the micromirror of rectangular shape, those dimension definitions are applicable to any micromirrors and micromirror arrays.

According to the invention, the diameter of the micromirror array is preferably from 0.55 inch to 0.8 inch, more preferably from 0.65 to 0.85 inch, and more preferably around 0.7 inch. The total number of mirror devices in the spatial light modulator, which is referred to as the natural resolution of the spatial light modulator, is preferably 640×480 (VGA) or higher, such as 800×600 (SVGA) or higher, 1024×768 (XGA) or higher, 1280×1024 (SXGA) or higher, 1280×720 or higher, 1400×1050 or higher, 1600×1200 (UXGA) or higher, and 1920×1080 or higher. The micromirror devices each have a characteristic dimension in the order of microns, such as 100 micros or less, 50 microns or less, and 15 microns or less. The micromirror devices are arranged in arrays preferably with a pitch of 10.16 microns or less, such as from 4.38 to 10.16 microns. The gap between the adjacent micromirror devices is preferably 1.5 microns or less, such as 1 micron or less, 0.5 micron or less, more preferably from 0.1 to 0.5 micron, as set forth in U.S. patent applications Ser. No. 10/627,302 filed Jul. 24, 2003, the subject matter being incorporated herein by reference in entirety.

Figure 7:
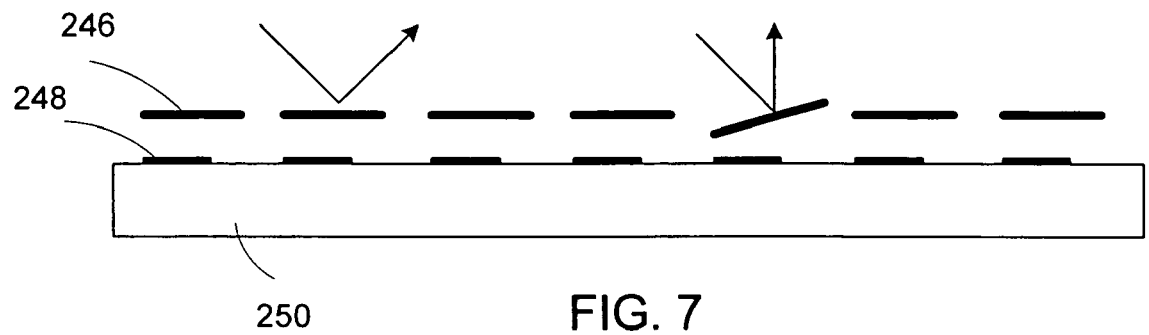
FIG. 7 demonstratively illustrates a cross-sectional view of an exemplary spatial light modulator having array of deflectable reflective mirror plates.

The micromirror devices of the spatial light modulator as discussed above may have a variety of configurations, one of which is illustrated in FIG. 7. Referring to FIG. 7, the spatial light modulator comprises an array of reflective and deflectable mirror pates, such as mirror plate 246. For simplicity purposes, only seven mirror plates are illustrated therein. In fact, the spatial light modulator may comprise any desired number of mirror plates, as discussed above with reference to FIG. 6. For electrostatically deflecting the mirror plates, each mirror plate is associated with an addressing electrode 248, such as addressing electrode, formed on semiconductor substrate 250 that is disposed proximate to the mirror plates. In operation, an electrostatic field is established between the mirror plate and the associated addressing electrode. The electrostatic field derives an electrostatic force, which yields an electrostatic torque on the mirror plate. Under the electrostatic torque, the mirror plate moves relative substrate 250. The electrostatic field is established in accordance with a stream of image data, such as bitplane data derived from the desired images and videos.

In the above example, each mirror plate is associated with one addressing electrode for deflecting the mirror plate according to the image data. In another embodiment, each mirror plate can be associated with multiple addressing electrodes, which will not be detailed herein. In addition to the addressing electrodes, another electrode can be provided for deflecting the mirror plate in the direction opposite to that resulted from the addressing electrode, which will be discussed afterwards with reference to FIG. 8.

Figure 8:
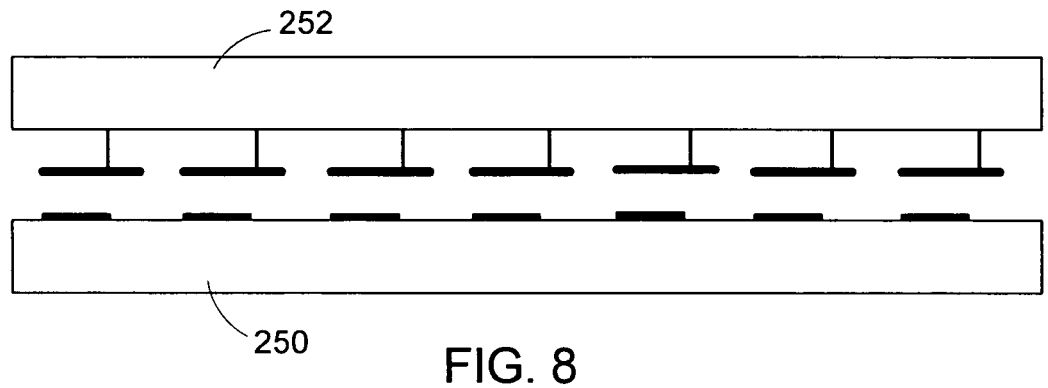
FIG. 8 demonstratively illustrates a cross-sectional view of another exemplary spatial light modulator having array of deflectable reflective mirror plates.

Referring to FIG. 8, an exemplary spatial light modulator is illustrated therein. In this specific example, the reflective and deflectable mirror plates are formed on light transmissive substrate 252, such as glass, quartz, and sapphire. The addressing electrodes are formed on semiconductor substrate 250. The two substrates can be bonded together with a spacer so as to maintain a uniform and constant vertical distance therebetween.

The spatial light modulator may have other features, such as a light transmissive electrode formed on the light transmissive substrate, as set forth in U.S. patent application Ser. No. 11/102,531 filed Apr. 8, 2005, the subject matter being incorporated herein by reference in its entirety.

Alternative to forming the mirror plates on a separate substrate than the semiconductor substrate on which the addressing electrodes are formed, the mirror plates and addressing electrodes can be formed on the same substrate, which preferably is the semiconductor substrate, which is not shown in the figure.

In another embodiment, the mirror plates can be derived from a single crystal, such as single crystal silicon, as set forth in U.S. patent applications Ser. No. 11/056,732, Ser. No. 11/056,727, and Ser. No. 11/056,752 all filed Feb. 11, 2005, the subject matter of each being incorporated herein by reference in entirety.

Figure 9:
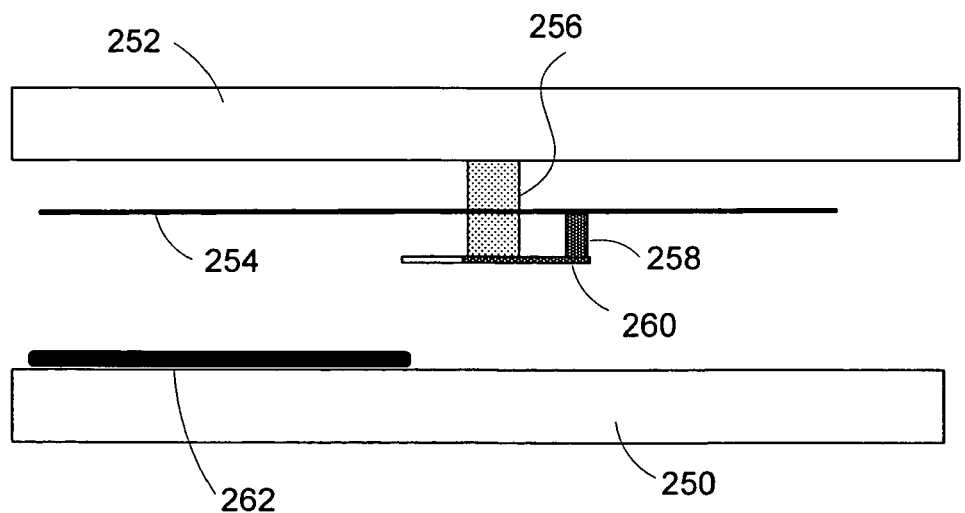
FIG. 9 demonstratively illustrates a cross-sectional view of an exemplary micromirror device that can be used in the spatial light modulators shown in FIGS. 7 and 8.

The micromirrors as shown in FIG. 8 have a variety of different configurations, one of which is demonstratively illustrated in a cross-sectional view in FIG. 9. Referring to FIG. 9, the micromirror device comprises reflective deflectable mirror plate 254 that is attached to deformable hinge 258 via hinge contact 260. The deformable hinge, such as a torsion hinge, is held by a hinge support that is affixed to post 256 on light transmissive substrate 252. Addressing electrode 262 is disposed on semiconductor substrate 250, and is placed proximate to the mirror plate for electrostatically deflecting the mirror plate. Other alternative features can also be provided. For example, a stopper can be provided for limiting the rotation of the mirror plate when the mirror plate is at the desired angles, such as the ON state angle. The ON state angle is preferably 10° degrees or more, 12° degrees or more, or 14° degrees or more relative to substrate 252. For enhancing the transmission of the incident light through the light transmissive substrate 252, an anti-reflection film can be coated on the lower surface of substrate 252. Alternative the anti-reflection film, a light transmissive electrode can be formed on the lower surface of substrate 252 for electrostatically deflecting the mirror plate towards substrate 252. An example of such electrode can be a thin film of indium-tin-oxide. The light transmissive electrode can also be a multi-layered structure. For example, it may comprise an electrically conductive layer and electrically non-conductive layer with the electrically conductive layer being sandwiched between substrate 252 and the electrically non-conductive layer. This configuration prevents potential electrical short between the mirror plate and the electrode. The electrically non-conductive layer can be $SiO_x$, $TiO_x$, $SiN_x$, and $NbO_x$, as set forth in U.S. patent application Ser. No. 11/102,531 filed Apr. 8, 2005, the subject matter being incorporated herein by reference. In other embodiments of the invention, multiple addressing electrodes can be provided for the micromirror device, as set forth in U.S. patent application Ser. No. 10/437,776 filed May 13, 2003, and Ser. No. 10/947,005 filed Sep. 21, 2004, the subject matter of each being incorporated herein by reference in entirety. Other optical films, such as a light transmissive and electrically insulating layer can be utilized in combination with the light transmissive electrode on the lower surface of substrate 252 for preventing possible electrical short between the mirror plate and light transmissive electrode.

In the example shown in FIG. 9, the mirror plate is associated with one single addressing electrode on substrate 250. Alternatively, another addressing electrode can be formed on substrate 250, but on the opposite side of the deformable hinge.

The micromirror device as shown in FIG. 9 is only one example of many applicable examples of the invention. For example, in the example as shown in FIG. 9 the mirror plate is attached to the deformable hinge such that the mirror plate rotates asymmetrically. That is the maximum rotation angle (e.g. the ON state angle) achievable by the mirror plate rotating in one direction (the direction towards the ON state) is larger than that (e.g. the OFF stat angle) in the opposite rotation direction (e.g. the direction towards the OFF state). This is accomplished by attaching the mirror plate to the deformable hinge at a location that is not at the center of the mirror plate such that the rotation axis of the mirror plate is offset from a diagonal of the mirror plate. However, the rotation axis may or may not be parallel to the diagonal. Of course, the mirror plate can be attached to the deformable hinge such that the mirror plate rotates symmetrically. That is the maximum angle achievable by rotating the mirror plate is substantially the same as that in the opposite rotation direction.

The mirror plate of the micromirror shown in FIG. 9 can be attached to the deformable hinge such that the mirror plate and deformable hinge are in the same plane. In an alternative embodiment of the invention, the deformable hinge can be located in a separate plane as the mirror plate when viewed from the top of the mirror plate at a non-deflected state, which will not be discussed in detail herein.

In the following, selected exemplary micromirror devices having the cross-sectional view of FIG. 9 will be discussed with reference to FIG. 10 and FIG. 11. It will be immediately understood by those skilled in the art that the following discussion is for demonstration purposes only and is not intended to be limiting. Instead, any variations without departing from the spirit of the invention are also applicable.

Figure 10:
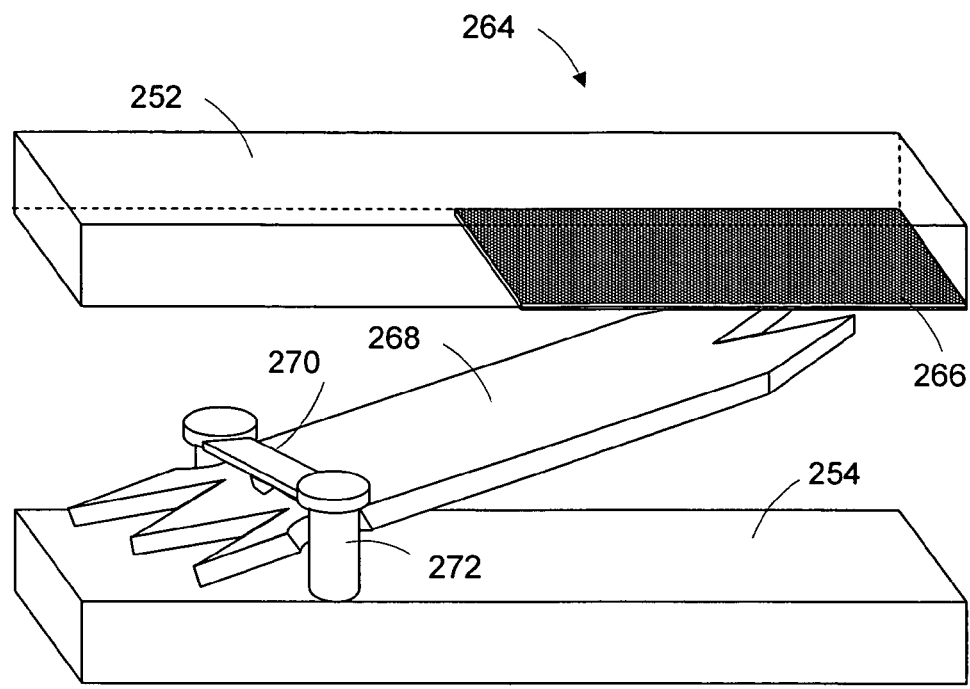
FIG. 10 demonstratively illustrates a perspective view of an exemplary micromirror device having the cross-sectional view of FIG. 9.

Referring to FIG. 10, a perspective view of an exemplary micromirror device in which embodiments of the invention are applicable is illustrated therein. Micromirror device 264 comprises substrate 254 that is a light transmissive substrate such as glass, quartz, and sapphire and semiconductor substrate 252, such as silicon substrate. Deflectable and reflective mirror plate 268 is spaced apart and attached to deformable hinge 270 via a hinge contact. The deformable hinge is affixed to and held by posts 272. The semiconductor substrate has addressing electrode 266 for deflecting the mirror plate. A light blocking pad can be alternatively formed between the surface of post 272 and substrate 254 for reducing unexpected light scattering from the exposed surface of the posts.

The deflectable and reflective mirror plate can be a multi-layered structure. For example, the mirror plate may comprise an electrical conducting layer, a reflective layer that is capable of reflecting 85% or more, or 90% or more, or 95% or more, or 99% or more of the incident light (e.g. incident visible light), and a mechanical enhancing layer that enhances the mechanical properties of the mirror plate. An exemplary mirror plate can be a multilayered structure comprising a $SiO_2$ layer, an aluminum layer, a titanium layer, and a titanium nitride layer. When aluminum is used for the mirror plate, and amorphous silicon is used as the sacrificial material, diffusion between the aluminum layer and the sacrificial material may occur. This can be avoided by depositing a baffler layer therebetween.

Figure 11:
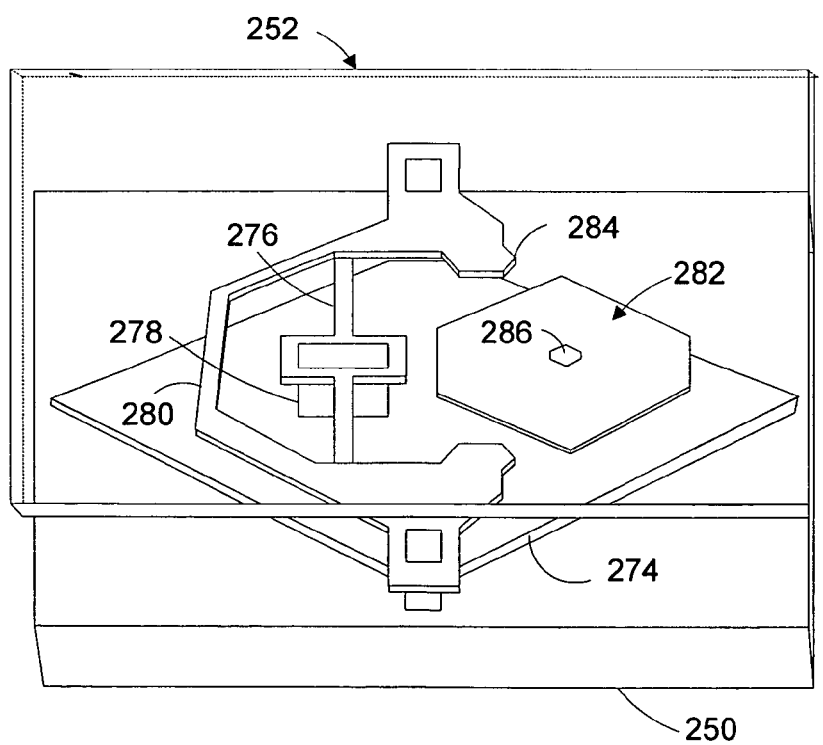
FIG. 11 demonstratively illustrates a perspective view of another exemplary micromirror device having the cross-sectional view of FIG. 9.

Another exemplary micromirror device having a cross-sectional view of FIG. 9 is illustrated in its perspective view in FIG. 11. Referring to FIG. 11, deflectable reflective mirror plate 274 with a substantially square shape is formed on light transmissive substrate 250, and is attached to deformable hinge 276 via hinge contact 278. The deformable hinge is held by hinge support 280, and the hinge support is affixed and held by posts on the light transmissive substrate. For electrostatically deflecting the mirror plate, an addressing electrode (not shown in the figure for simplicity purposes) is fabricated in the semiconductor substrate 252. For improving the electrical coupling of the deflectable mirror plate to the electrostatic field, extending metallic plate 282 can be formed on the mirror plate and contacted to the mirror plate via post 286. A light blocking pad can be alternatively disposed between the surface of the post and substrate 250 so as to reduce unexpected light scattering from the post. The light blocking pad can also be deployed in a way so as to block light scattered from other portions of the micromirror, such as the tips (or the corners) of the mirror plate of the micromirror, and the exterior surfaces (e.g. the walls) of the posts.

The mirror plate is preferably attached to the deformable hinge asymmetrically such that the mirror plate can be rotated asymmetrically for achieving high contrast ratio. Similar to that shown in FIG. 10, the deformable hinge is preferably formed beneath the deflectable mirror plate in the direction of the incident light so as to avoid unexpected light scattering by the deformable hinge. For reducing unexpected light scattering of the mirror plate edge, the illumination light is preferably incident onto the mirror plate along a corner of the mirror plate.

Figure 12:
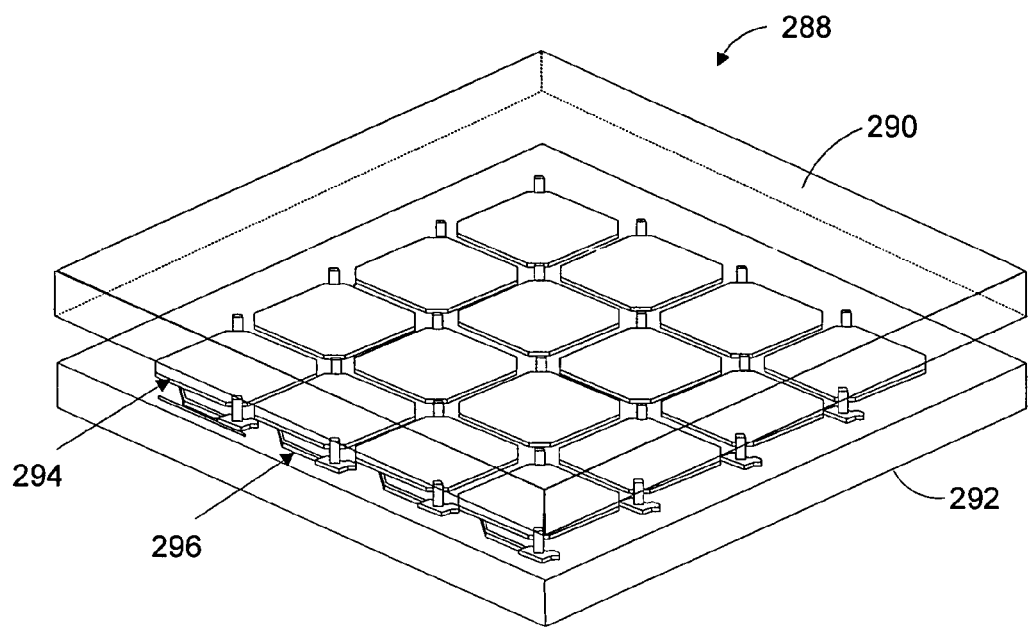
FIG. 12 demonstratively illustrated a perspective view of a spatial light modulator having an array of micromirror devices in FIG. 11.

Referring to FIG. 12, an exemplary spatial light modulator having an array of micromirrors of FIG. 11 is illustrated therein. For simplicity purposes, only 4×4 micromirrors are presented. In general, the micromirror array of a spatial light modulator consists of thousands or millions of micromirrors, the total number of which determines the resolution of the displayed images. For example, the micromirror array of the spatial light modulator may have 800×600 (SVGA) or higher, 1024×768 (XGA) or higher, 1280×1024 (SXGA) or higher, 1280×720 or higher, 1400×1050 or higher, 1600×1200 (UXGA) or higher, and 1920×1080 or higher, micromirror devices. In other applications, the micromirror array may have less number of micromirrors.

In this example, the array of deflectable reflective mirror plates 294 is disposed between light transmissive substrate 290 and semiconductor substrate 292 having formed thereon an array of addressing electrodes 296 each of which is associated with a mirror plate for electrostatically deflecting the mirror plate. The posts of the micromirrors can be covered by light blocking pads for reducing expected light scattering from the surfaces of the posts.

In operation, the illumination light passes through the light transmissive substrate and illuminates the reflective surfaces of the mirror plates, from which the illumination light is modulated. The illumination light incident onto the areas corresponding to the surfaces of the posts are blocked (e.g. reflected or absorbed depending upon the materials of the light blocking pads) by the light blocking pads. The reflected illumination light from the mirror plates at the ON state is collected by the projection lens so as to generate a "bright" pixel in the display target. The reflected illumination from the mirror plates at the OFF state travels away from the projection lens, resulting in the corresponding pixels imagined at the display target to be "dark."

Figure 13:
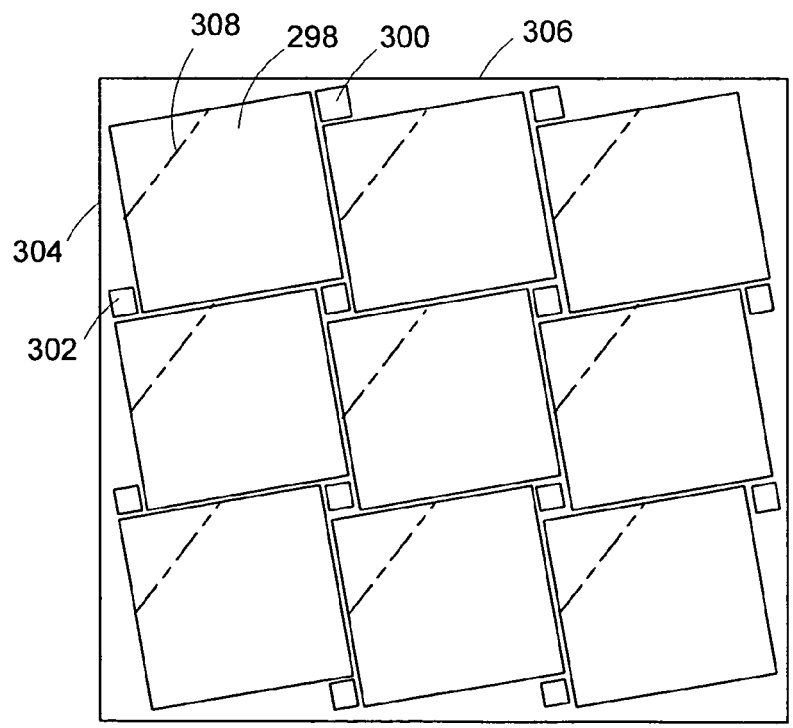
FIG. 13 is a top view of another exemplary spatial light modulator useable in the projection system of the invention.

The micromirrors in the micromirror array of the spatial light modulator can be arranged in alternative ways, another one of which is illustrated in FIG. 13. Referring to FIG. 13, each micromirror is rotated around its geometric center an angle less than 45° degrees. The posts (e.g. 300 and 302) of each micromirror (e.g. mirror 298) are then aligned to the opposite edges of the mirror plate. No edges of the mirror plate are parallel to an edge (e.g. edges 304 or 306) of the micromirror array. The rotation axis (e.g. axis 308) of each mirror plate is parallel to but offset from a diagonal of the mirror plate when viewed from the top of the mirror plate at a non-deflected state.

Figure 14:
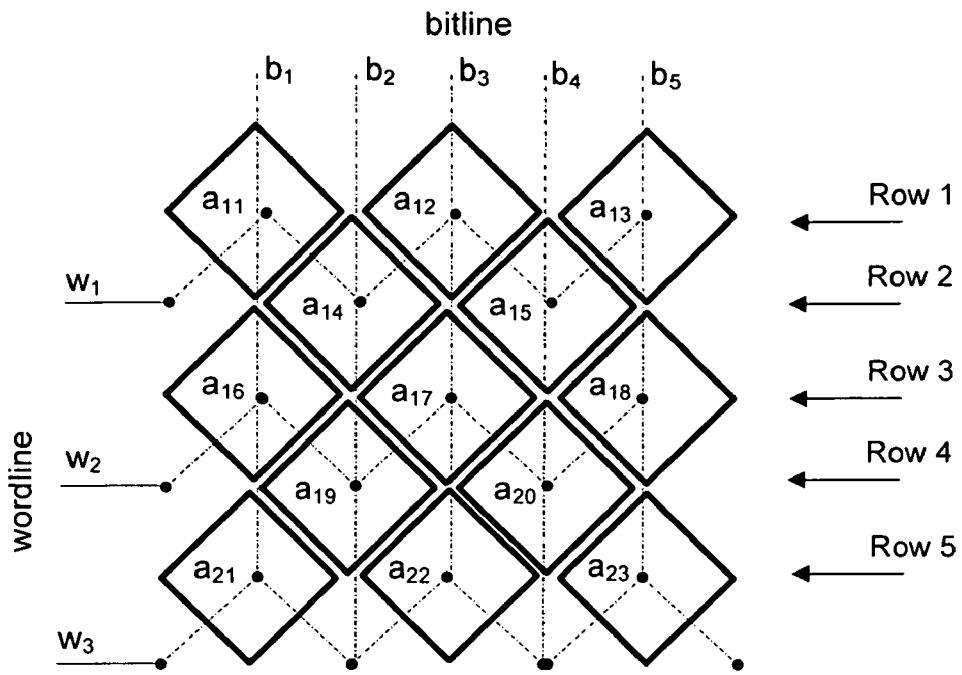
FIG. 14 is a top view of yet another exemplary spatial light modulator useable in the projection system of the invention.

FIG. 14 illustrates the top view of another micromirror array having an array of micromirrors of FIG. 9. In this example, each micromirror is rotated 45° degrees around its geometric center. For addressing the micromirrors, the bitlines and wordlines are deployed in a way such that each column of the array is connected to a bitline but each wordline alternatively connects micromirrors of adjacent rows. For example, bitlines $b_1$, $b_2$, $b_3$, $b_4$, and $b_5$ respectively connect micromirrors groups of ($a_{11}$, $a_{16}$, and $a_{21}$), ($a_{14}$ and $a_{19}$), ($a_{12}$, $a_{17}$, and $a_{22}$), ($a_{15}$ and $a_{20}$), and ($a_{13}$, $a_{18}$, and $a_{23}$). Wordlines $w_1$, $w_2$, and $w_3$ respectively connect micromirror groups ($a_{11}$, $a_{14}$, $a_{12}$, $a_{15}$, and $a_{13}$), ($a_{16}$, $a_{19}$, $a_{17}$, $a_{20}$, and $a_{18}$), and ($a_{21}$, $a_{22}$, and $a_{23}$). With this configuration, the total number of wordlines is less the total number of bitlines.

Figure 15:
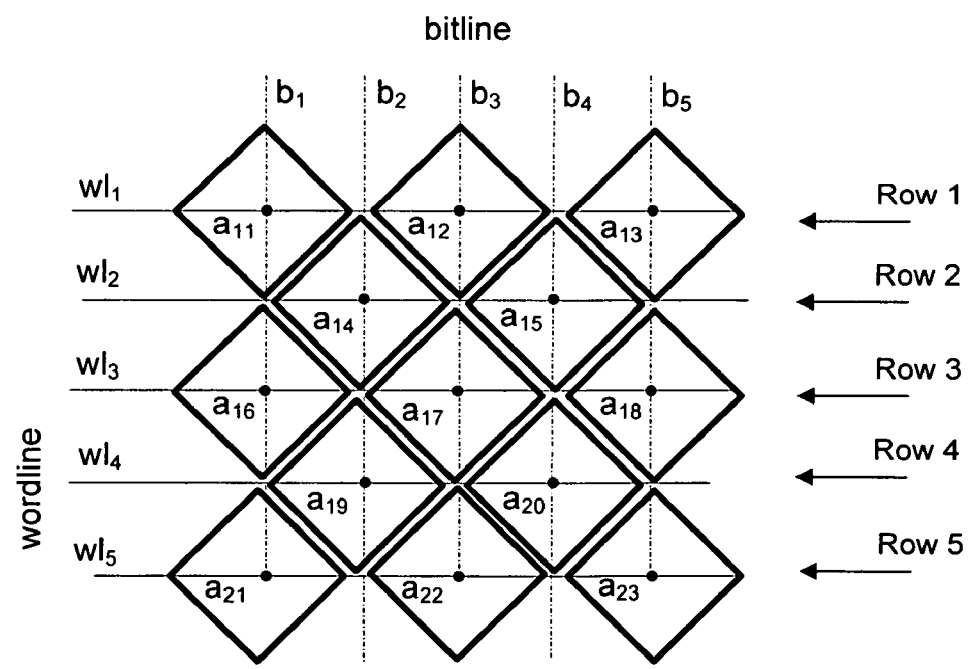
FIG. 15 is a top view of yet another exemplary spatial light modulator useable in the projection system of the invention.

For the same micromirror array, the bitlines and wordlines can be deployed in other ways, such as that shown in FIG. 15. Referring to FIG. 15, each row of micromirrors is provided with one wordline and one bitline. Specifically, bitlines $b_1$, $b_2$, $b_3$, $b_4$ and $b_5$ respectively connect column 1 (comprising micromirrors $a_{11}$, $a_{16}$, and $a_{21}$), column 2 (comprising micromirrors $a_{14}$ and $a_{19}$), column 3 (comprising micromirrors $a_{12}$, $a_{17}$, and $a_{22}$), column 4 (comprising micromirrors $a_{15}$ and $a_{20}$), and column 5 (comprising micromirrors $a_{13}$, $a_{18}$, and $a_{23}$). Wordlines $WL_1$, $WL_2$, $WL_3$, $WL_4$, and $WL_5$ respectively connect row 1 (comprising micromirrors $a_{11}$, $a_{12}$, and $a_{13}$), row 2 (comprising micromirrors $a_{14}$ and $a_{15}$), row 3 (comprising micromirrors $a_{16}$, $a_{17}$, and $a_{18}$), row 4 (comprising micromirrors $a_{19}$ and $a_{20}$) and row 5 (comprising micromirrors $a_{21}$, $a_{22}$, and $a_{23}$).

Figure 16A:
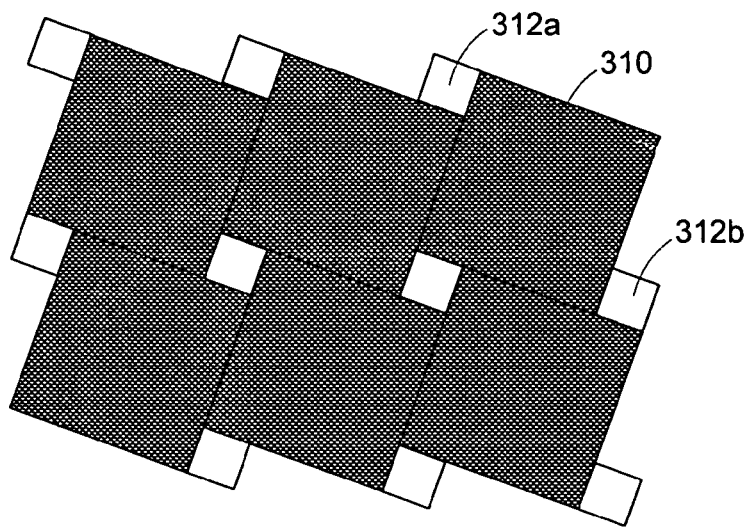
FIGS. 16a, 16b, and 16c are top views of yet another exemplary spatial light modulator useable in the projection system of the invention.
Figure 16B:
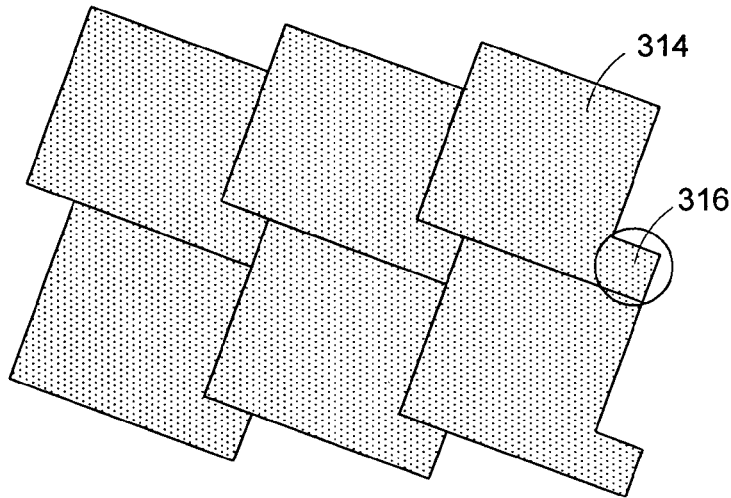
Figure 16C:
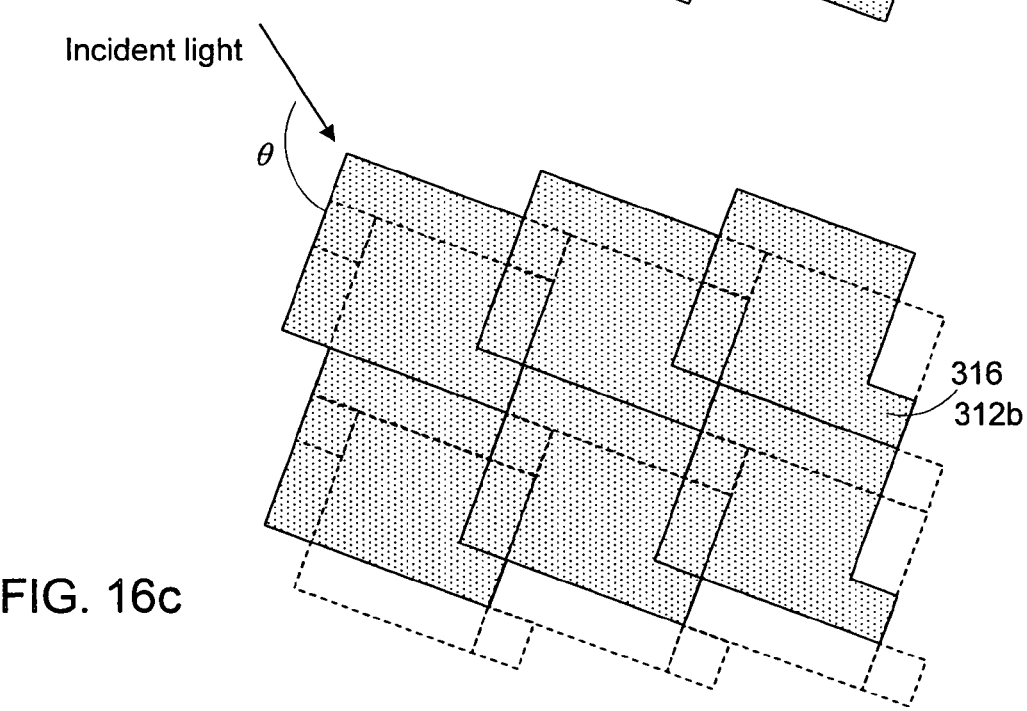

According to another embodiment of the invention, the mirror plates of the micromirrors in the array can form a plurality of pockets, in which posts can be formed, wherein the pockets are covered by the extended areas of the addressing electrodes when viewed from the top of the micromirror array device, as shown in FIGS. 16a to 16c.

Referring to FIG. 16a, a portion of an array of mirror plates of the micromirrors is illustrated therein. The mirror plates in the array form a plurality of pockets in between. For example, pockets 312a and 312b are formed in which posts for supporting and holding mirror plate 310 can be formed. For individually addressing and deflecting the mirror plates in FIG. 16a, an array of addressing electrodes is provided, a portion of which is illustrated in FIG. 16b.

Referring to FIG. 16b, each addressing electrode has an extended portion, such as extended portion 316 of addressing electrode 314. Without the extended portion, the addressing electrode can be generally square, but having an area equal to or smaller than the mirror plate.

FIG. 16c illustrates a top view of a micromirror array device after the addressing electrodes in FIG. 16b and the mirror plates in FIG. 16a being assembled together. It can be seen in the figure that each addressing electrode is displaced a particular distance along a diagonal of the mirror plate associated with the addressing electrode. As a result, the pockets presented between the mirror plates are covered by the addressing electrode, specifically by the extended portions of the addressing electrodes. In this way, light scattering otherwise occurred in the substrate having the addressing electrodes can be removed. The quality, such as the contrast ratio of the displayed images can be improved.

When used in a spatial light modulator of a display system as shown in FIG. 1 to FIG. 5, the incident light beam is directed onto the mirror plates in a direction along the displacement direction of the addressing electrodes when viewed from the top of the addressing electrodes as shown in the figure. For example, the incident light has an angle θ to an edge of the addressing electrode (or the mirror plate) when viewed from the top; and the angle can be 135° degrees.

In accordance with another embodiment of the invention, not all the micromirror devices of a spatial light modulator have posts (e.g. at that set forth in U.S. patent application Ser. No. 10/969,251 and Ser. No. 10/969,503 both filed Oct. 19, 2004, the subject matter of each being incorporated herein by reference in entirety.

Multi-Wordline Configurations

For deflecting the mirror plates, the addressing electrodes are provided and associated with the mirror plates. Each addressing electrode is connected to a voltage output node of a memory cell, such as a DRAM cell, SRAM cell, Latch, or charge-pump pixel cell, as set forth in U.S. patent applications Ser. No. 10/340,162 filed Jan. 10, 2003, and Ser. No. 10/407,061 filed Apr. 2, 2003, the subject matter of each being incorporated herein by reference. A charge-pump pixel cell is a memory cell that comprises a transistor whose source is connected to a bitline, gate is connected to a wordline, and drain is connected to the first plate of a capacitor with the second plate of the capacitor being connected to a pumping line. The first plate and the drain form a voltage output node to which an addressing electrode is connected. The wordlines and bitlines are driven by one or more wordline drivers and bitplane drives.

The memory cells of the row of the memory cell array can be connected to multiple wordlines for activating the memory cells of the row. This configuration has many advantages over those in the art wherein the wordline activates all memory cells of the row simultaneously for writing the intended memory cells during a writing cycle. Consequently, the timing of write events is highly correlated. This time-correlation may cause artifacts, such as dynamic-false-contouring (DFC) in display systems that employ memory cell arrays for controlling the pixels of the display systems and pulse-width-modulation (PWM) technique for displaying gray-scales of images. With the scheme of multiple wordline for activating the memory cells in a row, the artificial effect, such as the DFC, can be eliminated.

Figure 17:
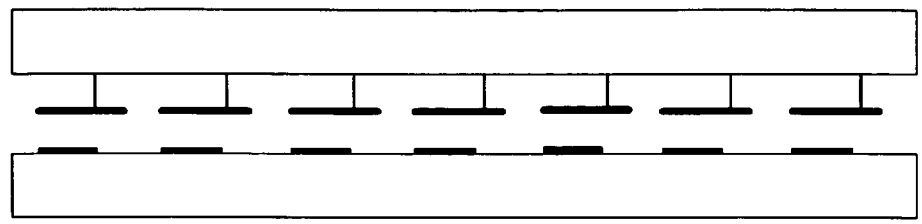
FIG. 17 is a cross-sectional views of yet another exemplary spatial light modulator.
Figure 18:
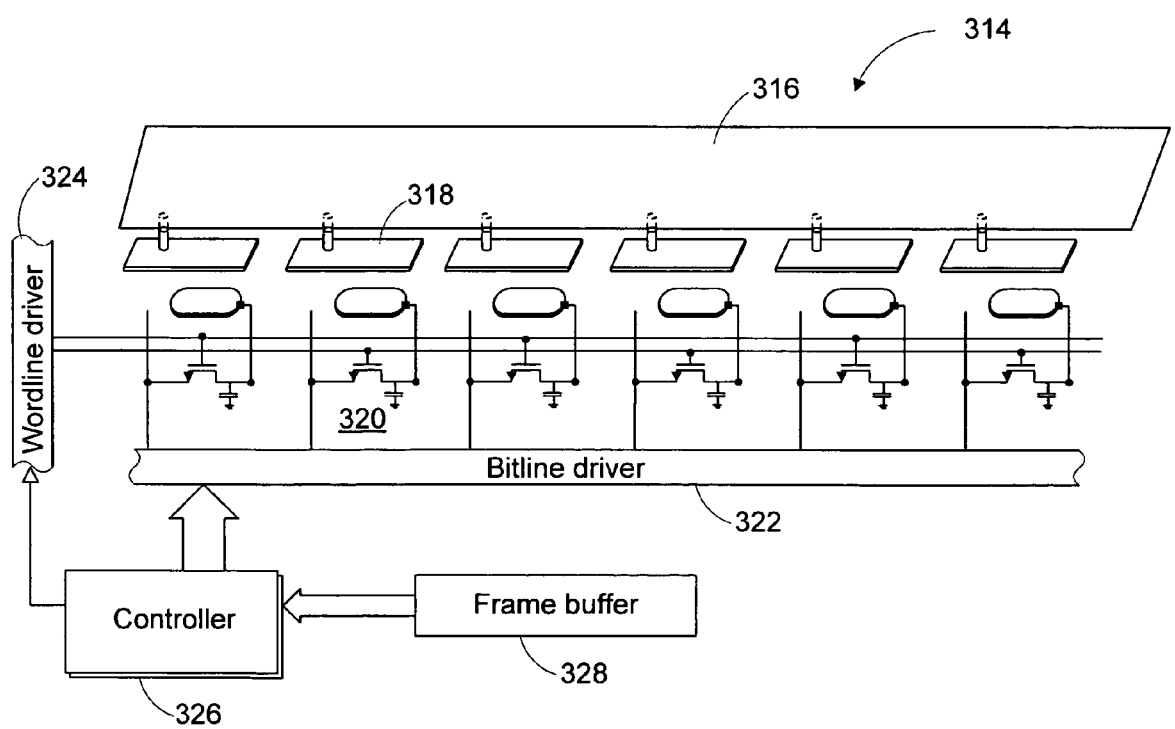
FIG. 18 is a cross-sectional view of a row of the micromirror device in FIG. 17.

An exemplary configuration for use in the spatial light modulator as shown in FIG. 17 wherein the mirror plates are formed on a light transmissive substrate and addressing electrodes are formed on a semiconductor substrate is demonstratively illustrated in FIG. 18. Referring to FIG. 18, each mirror plate is movable and associated with an electrode and memory cell. For example, mirror plate 318 is associated with memory cell 320 and an addressing electrode that is connected to a voltage node of the memory cell. In other alternative implementations, each memory cell can be associated with a plurality of mirror plates. Specifically, each memory cell is connected to a plurality of pixels (e.g. mirror plates) of a spatial light modulator for controlling the state of those pixels of the spatial light modulator. As shown in the figure, the memory cells in the row are connected to dual wordlines for being activated. The wordlines are connected to wordline driver 324 that controls the wordlines. Each memory cell is connected to a bitline, and the bitlines of the memory cells are connected to bitline driver 322. In operation, controller 326 initiates an activation of selected memory cells by sending an activation signal to wordline driver 324. The wordline driver 324 activates the selected memory cells by activating the wordline connected to the selected memory cells. Meanwhile, the controller retrieves a stream of image data (e.g. bitplane data derived from the desired images or videos) to be written to the selected memory cells from frame buffer 328 and passes the retrieved bitplane data to the bitline driver, which then delivers the bitplane data to the selected memory cells that are activated.

The memory cells of the row are connected to a plurality of wordlines (though only two wordlines are presented in the figure), such as the multiple wordline in memory cell array as disclosed in US patent application "Methods and Apparatus for Selectively Updating Memory Cell Arrays" filed on Apr. 2, 2003 to Richards, the subject matter being incorporated herein by reference. The provision of the multiple wordline enables the memory cells of the row to be selectively updated. The timing of update events to neighboring memory cells of the row can thus be decorrelated. This configuration is especially useful in digital display systems that use a pulse-width-modulation technique. Artifacts, such as dynamic-false-contouring artifacts can be reduced or eliminated. Therefore, the perceived quality of the images or video frames is improved.

Figure 19:
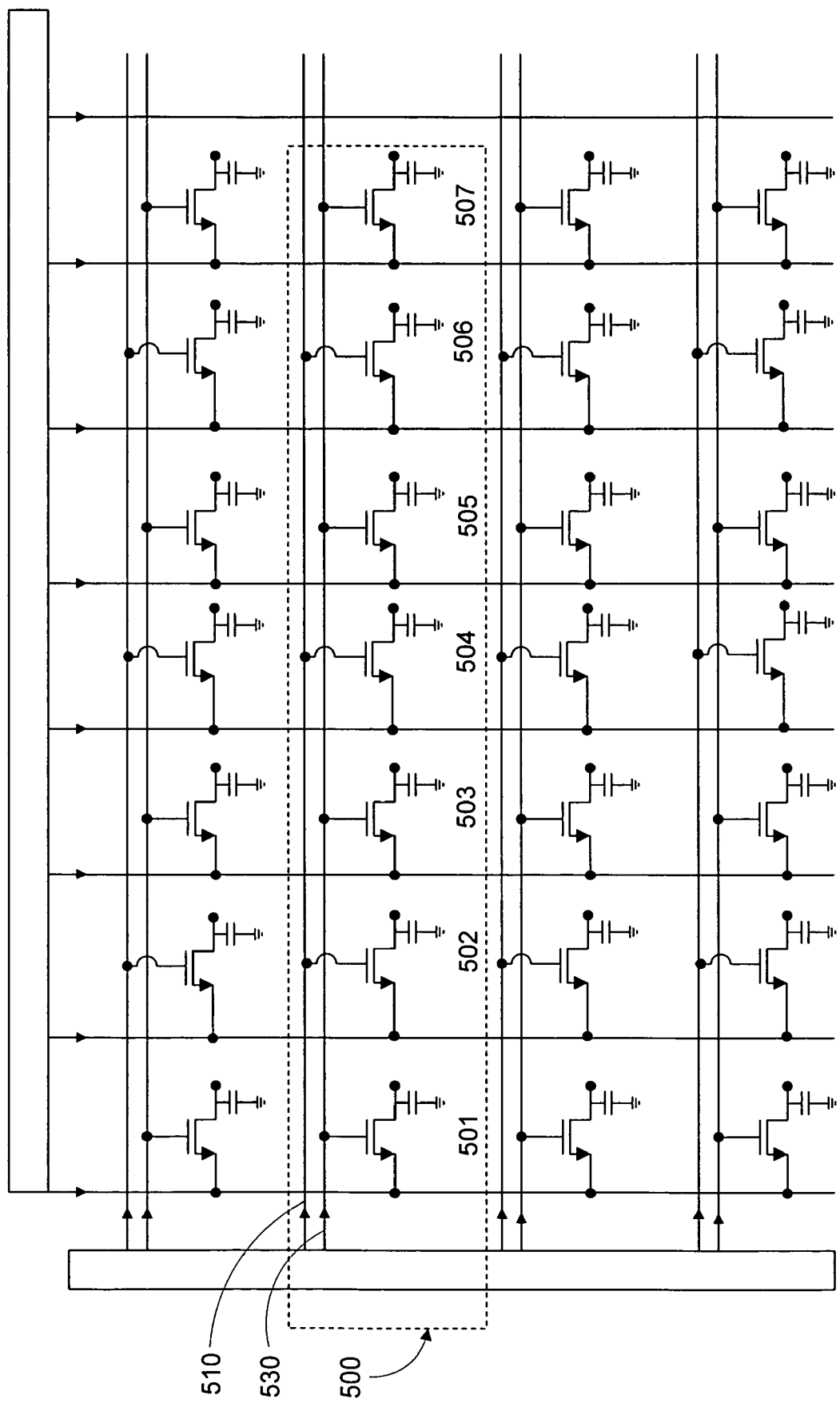
FIG. 19 illustrates an exemplary memory cell array for use in the spatial light modulators in the projection systems of the invention.

The memory cell array as shown in FIG. 18 is better illustrated in FIG. 19. Referring to FIG. 19, a memory cell array according to an embodiment of the invention is illustrated therein. The memory cell array has two wordlines for each row of the array, and memory cells of a row are connected to separate wordlines. For example, memory cell row 500 has two separate wordlines 510 and 530. Neighboring memory cells of each row are connected to separate wordlines. Specifically, odd numbered memory cells are in one subgroup, and even numbered memory cells are in another subgroup. Memory cells in different subgroups are connected to separate wordlines. For example, memory cells 501 and 502 are respectively connected to wordlines 530 and 510. Memory cells in the same subgroup are connected to the same wordline. For example, memory cells 501 and 503 (or memory cells 502 and 504) are connected to wordline 530 (or 510). With this configuration, neighboring memory cells can be activated separately. The time-correlation between neighboring pixels in current memory cell arrays can thus be removed. In an aspect of the invention, neighboring memory cells can also be activated asynchronously or synchronously as desired by properly scheduling the activation events of the wordlines. For example, memory cell 501 can be activated earlier via wordline 530 than memory cell 502 via wordline 510. Of course, the two wordlines can be synchronized, and all memory cells in the row (e.g. row 500) can be activated at the same time by synchronizing the wordlines. Under the control of the memory cell array, artificial effects, such as DFC artifacts can be reduced in the display system.

In association with the multi-wordline for a row configuration, multiple PWM waveform formats can be defined, upon which different PWM waveforms can be generated for producing the image data. In one example, at least two binary-weighted PWM waveform formats are defined. The first PWM waveform format is a binary-weighted waveform format starting from the least significant bit (LSB) and ending at the most significant bit (MSB). The second PWM waveform format is a binary-weighted waveform format starting from the MSB and ending at the LSB. Though preferred, other suitable waveform formats could also be applied. In particular, the waveform format can be a binary-weighted format with the binary weights randomly arranged. Alternatively, the waveform format can be non-binary weighted format. With the defined waveform formats, PWM waveforms are generated according to the desired grayscales.

Because the memory cells of a row in the memory cell array are connected to and capable of being activated by separate wordlines, the associated micromirror devices can be driven independently by separate waveforms. For example, the odd numbered memory cells can be activated by wordline 530 with one PWM waveform; while the even numbered memory cells can be activated by a separate wordline with a different PWM waveform.

Figure 20:
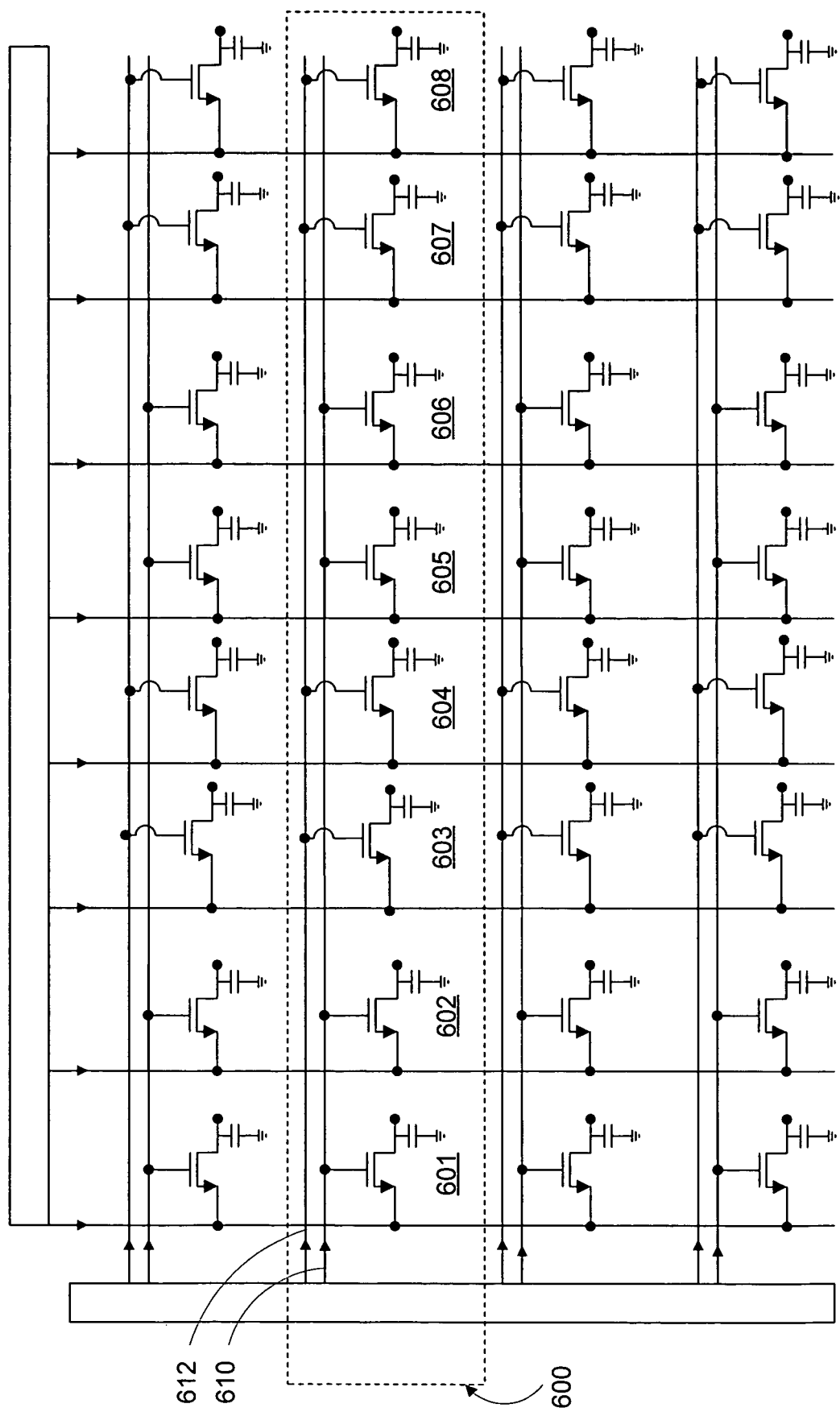
FIG. 20 illustrates another exemplary memory cell array for use in the spatial light modulators in the projection systems of the invention.

In the above described embodiments, the memory cells of each row of the memory cell array are grouped such that neighboring memory cells are in different subgroups and connected to separate wordlines. According to another embodiment of the invention, the memory cells of each of the memory cell array are grouped such that the positions of the memory cells in different subgroups are interleaved in the row, as shown in FIG. 20. Referring to FIG. 20, memory cells 601, 602, 605 and 606 of row 600 are in the same subgroup and are connected to the same wordline (e.g. wordline 610). Memory cells 603, 604, 607 and 608 of row 600 are grouped in another subgroup and are connected to wordline 612 that is separate from wordline 610.

Figure 21:
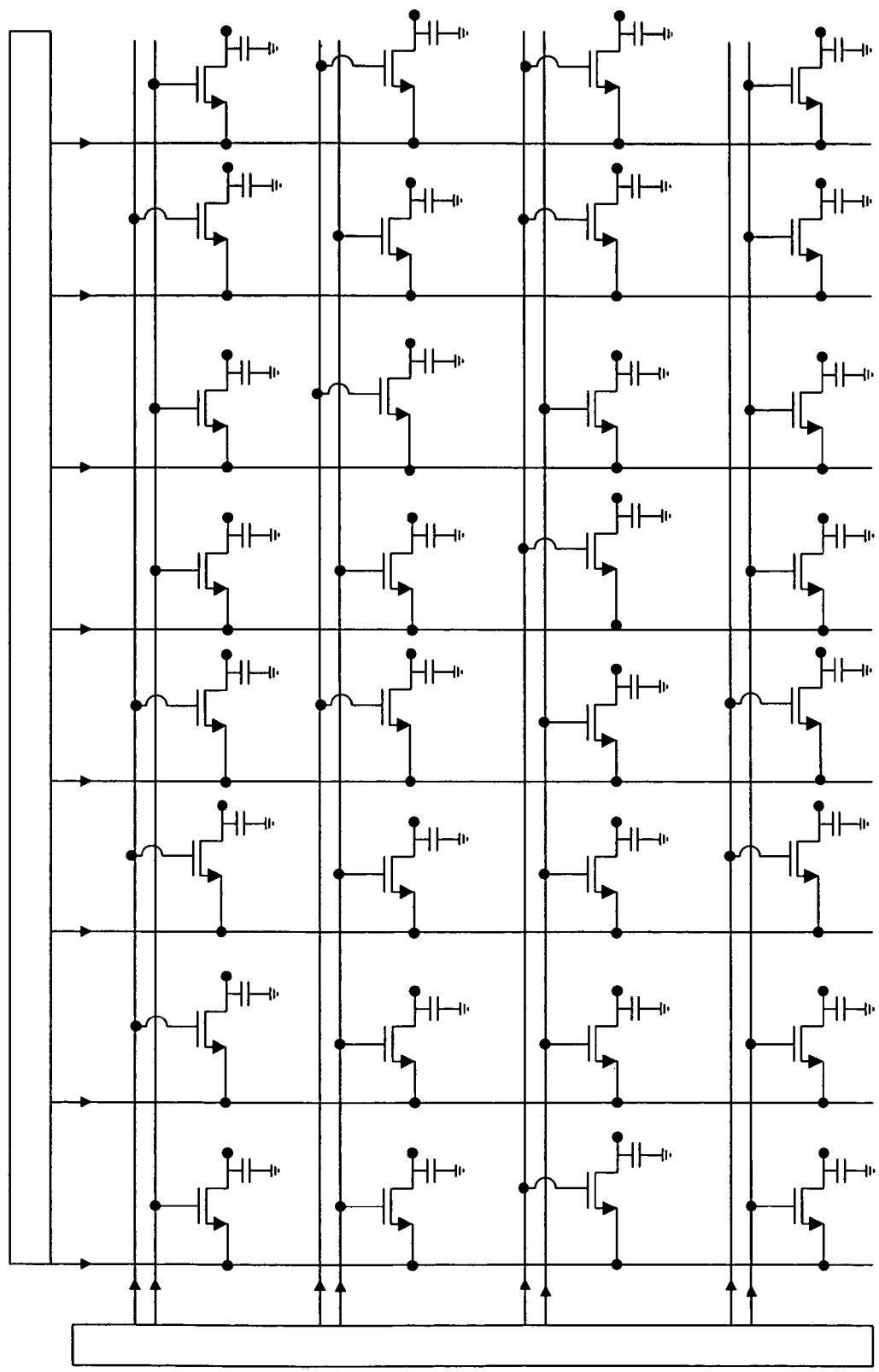
FIG. 21 illustrates yet another exemplary memory cell array for use in the spatial light modulators in the projection systems of the invention.

In yet another embodiment of the invention, memory cells of each row of the memory cell array are grouped randomly and at least two memory cells in the same row are grouped into different subgroups, as shown in FIG. 21.

In another exemplary configuration, the memory cells across the entire array can be divided into groups according to their activation scheme. By connecting the memory cells in the same group to a set of wordlines that are capable of being activated concurrently, and the memory cells in different groups to another set of wordlines, the memory cells in the entire array can be activated independently as desired.

FPGA in the Display System

To coordinate and control the operations of the system components, a control unit is provided for the system. The control unit has implemented therein a set of functional modules capable of controlling and coordinating the operations of the system components. According to the invention, the functional modules are implemented in Field-Programmable-Gate-Array (FPGA) logic cells, such as Xilinx SRAM-based FPGA. As a way of example, an exemplary FPGA board in accordance with an embodiment of the invention will be discussed with reference to the exemplary display system of FIG. 1 in FIG. 22. It will be appreciated by those skilled in the art that the following discussion is for demonstration purposes only, and should not be interpreted as a limitation. Instead, the FPGA board can also be applied to the other display systems, such as those discussed with reference to FIG. 2 to FIG. 5.

According to the invention, the FPGA board is desired to be capable of providing features that comprises: I2C slave interface, video input module, keystone module, luminance boost, Gamma adjust, encode, representation, VDMA, DDR control, PWM sequence, bias voltage, lamp interface, motor control, and debug console.

The I2C slave interface is capable of providing access from system controller to all programmable resources within the FPGA board. The video input module is capable of providing 24-bit RGB data input, supporting XGA (1024×768 at 60Hz) video input format up to 65 MHz pixel clock, supporting programmable sync and clock polarity, and supporting pixel clock monitor circuit reset video pipeline if pixel clock is invalid or absent. The keystone module is capable of supporting programmable 1-D (horizontal) keystone correction. The luminance boost module; and optionally mapping RGB input to RGBX output color space. The gamma module is capable of supporting programmable gamma for R, G, B, and X channels. The encoder module is capable of supporting programmable 4 channel×512 entry table for converting input levels to bitplane representation, up to 16 output bitplanes per channel, and programmable 64×64×4-bit dither threshold matrix. The VDMA module is capable of converting the pixel-at-a-time data to bitplane format data, and supporting programmable number of bitplanes and scan-line length to optimize bandwidth usage. The DDR controller is capable of supporting 100 MHz clock, interfaces to two 128 Mbit DDR RAM chips, clock mirror outputs for system-level clock skew cancellation, software control over clock enable and address bus for flexible initialization, 10 programmable timing parameters to support a wide range of DDR devices, and programmable refresh timing. The PWM sequencer is capable of providing programmable sequencing engine that supports a wide variety of modulation patterns, 50 MHz clock, digitally-controlled-impedance outputs for improving signal integrity and minimizing the cost, and X and Y image mirroring. The bias voltage module is capable of providing dedicated outputs for controlling that state of external bias-voltage. The lamp interface is capable of providing software-configurable interface for lamp startup, status and synchronization, compatible with Philips, Osram, and similar lamps, programmable sync/enable output timing and polarity. The motor controller is capable of compatible with Philips TDA5145 BLDC motor controller, phase lock color-wheel to video source with arbitrary frequency ratio, and video source sync filtered/validated to minimize motor speed transients. The debug console is capable of providing 38.4 kbps RS232 serial console for laboratory and factory debug, and "built-in" boot-loader that allows for in-system (re)programming of external flash devices.

Figure 22:
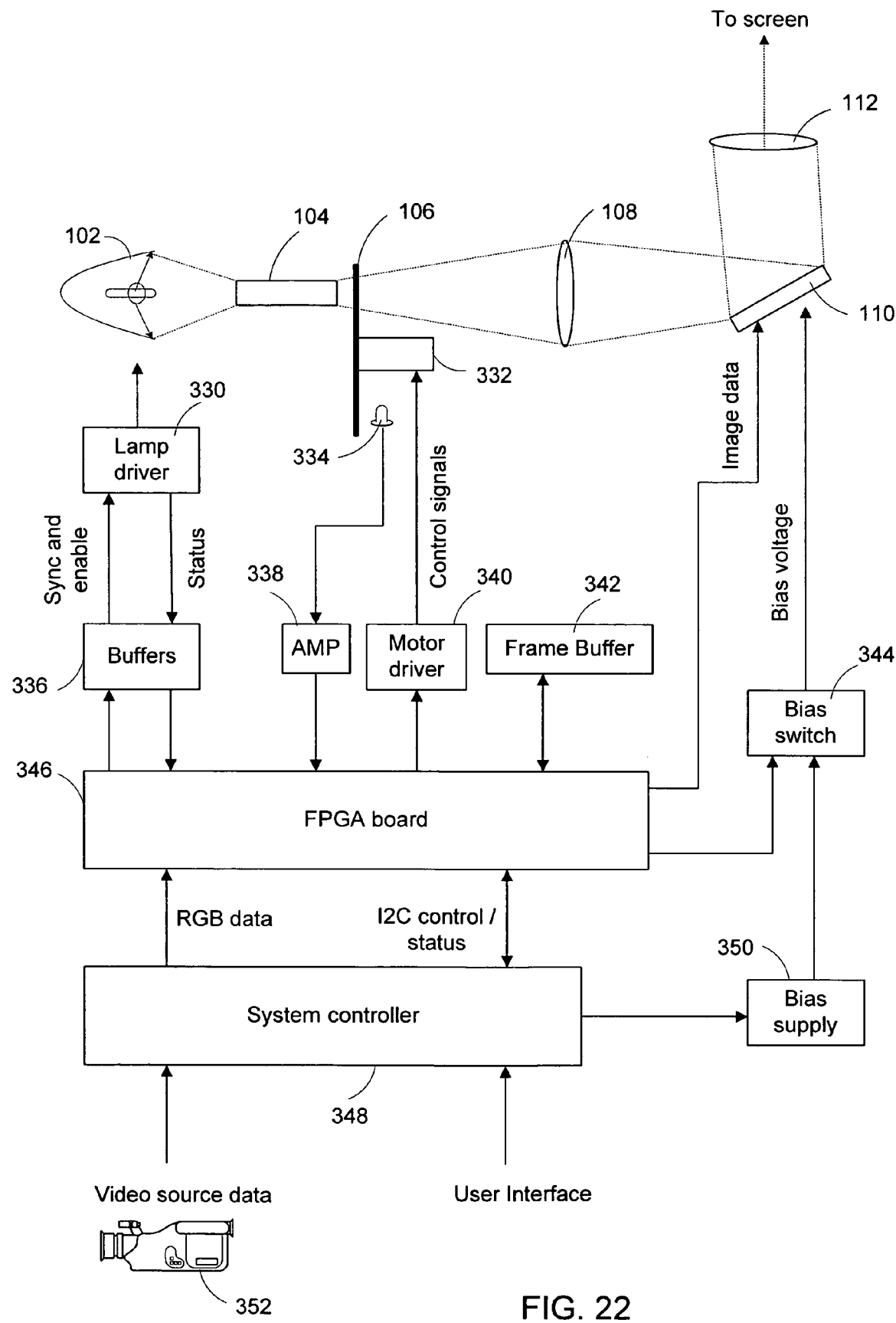
FIG. 22 is a block diagram of the control unit of the display system of the invention.

Referring to FIG. 22, an exemplary display system with an exemplary FPGA of the invention is demonstratively illustrated therein. The system comprises system controller 348 for receiving image or video contents from source 352, and providing the user interface. The system controller can be a computing device having a CPU or microcontroller, which is responsible for all system supervisory functions. Such functions include, but are not limited to, initialization and shutdown of the projector system, monitoring of the system's real-time status (temperature, lamp state), the product's user interface, and video source selection. The system controller will often reside in a scalar IC such as a PixelWorks or similar chip. The system controller is expected to interface with FPGA board 346 over the standard I2C interface. The system controller may act as the I2C master and the FPGA board may act as an I2C slave. The system controller can initiate write transactions to set various parameters within the FPGA chip, or initiating read transactions to verify parameters or check various status indications within the FPGA board.

The FPGA board receives instructions and image data from the system controller. With such instruction, the FPGA board is capable of controlling lamp 102, color wheel 106, and spatial light modulator 110. Specifically, the FPGA board sends instructions (e.g. synchronization and enable signals) and driving signals to lamp driver through buffer 336. The lamp driver drives the lamp with the received instructions and driving signals. Operations status of the lamp can be real-timely monitored by retrieving the status of the lamp through the buffer to the FPGA. For driving the color wheel, the FPGA board real-timely monitors the status (e.g. the phase of the color wheel) using photodetector 334. The output signal from the photodetector is delivered to amplifier 338 where the signal is amplified. The amplified status signal is obtained by the FPGA and analyzed accordingly. Based on the analyzed status of the color wheel, the FPGA board sends instructions and driving signals (e.g. driving current) to motor driver that controls the color wheel. An exemplary method of controlling the operations of the color wheel is set forth in U.S. patent application Ser. No. 11/128,607 filed May 13, 2005, the subject matter being incorporated herein by reference.

The FPGA board may be connected to build-in buffer 342 for saving and retrieving data, such as image data (e.g. bit-plane data complying with certain format), as set forth in U.S. patent applications Ser. No. 11/120,457 filed May 2, 2005, Ser. No. 10/982,259 filed Nov. 5, 2004, Ser. No. 10/865,993 filed Jun. 11, 2004, Ser. No. 10/607,687 filed Jun. 17, 2003, Ser. No. 10/648,608 filed Aug. 25, 2003, and Ser. No. 10/648,689 filed Aug. 25, 2005, the subject matter of each being incorporated herein by reference.

For controlling the operations of the micromirror devices in spatial light modulator 110, the FPGA communicates with the spatial light modulator and sends prepared image data retrieved from buffer 342 and instruction signals to the spatial light modulator. As an alternative feature, the bias on the micromirror devices can be adjusted, e.g. by changing the amplitude and/or polarity for eliminating potential charge accumulation and other purposes, as set forth in U.S. patent applications Ser. No. 10/607,687 filed Jun. 17, 2003, Ser. No. 11/069,408 filed Feb. 28, 2005, and Ser. No. 11/069,317 filed Feb. 28, 2005, the subject matter of each being incorporated herein by reference.

The bias adjusting is accomplished through bias switch 344 and bias supply 350. The bias supply is connected to and controlled by system controller 348, while bias switch is controlled by the FPGA board.

At the beginning of each operation (e.g. turning on the power of the display system), the FPGA board needs to be configured. For example, the Xilinx FPGA is an SRAM-based, volatile device. Each time it is powered on, it needs to be reloaded from an external nonvolatile source with the bit-stream representing the desired setup of the FPGA's internal registers, logic gates, and interconnect. There are two supported methods of configuration: master-serial mode and slave-serial mode.

In the master-serial mode, the FPGA board autonomously loads its configuration data from an external nonvolatile device upon power-up. The FPGA sources the CCLK signal to the external nonvolatile device which provides the configuration bit-stream on the FPGA. CRC's can be included within the bit-stream format to prevent a corrupted or invalid bit-stream from being loaded into the FPGA and subsequently causing problems. If a bad CRC or other bit-stream problem occurs, the FPGA will halt the configuration process and DONE will not go high. The system controller may check the state of the FPGA to determine whether configuration has completed successfully.

In the slave-serial configuration, the FPGA passively waits for a configuration bit-stream to be provided by an external source upon power-up. The FPGA's CCLK and DIN pins are inputs, driven by the external source. CRC's can be included within the bit-stream format to prevent a corrupted or invalid bit-stream from being loaded into the FPGA.

It is critical to send the bit-stream data to the FPGA in the correct bit order. The problem is compounded by inconsistent conventions on bit ordering in the various file formats used to represent the configuration bit-stream. At the hardware level, the bit-stream always includes a fixed 32-bit synchronization pattern that is present near the beginning of the bit-stream—usually in bytes 4 through 7 (counting from 0). At the DIN pin the correct synchronization pattern looks like this, where bits on the left are applied to DIN first: ". . . 10101010100110010101010101100110 . . . " For master-serial configuration, the Xilinx tool set generates a file in 'Intel-HEX' format representing the configuration ROM contents. The Intel-HEX file format is a standard widely used by standalone ROM programmers and other ROM programming system. The Intel-HEX format file is an ASCII file containing the ROM data as well as header, address, and checksum information for each small (~32 byte) block of data. The Intel-HEX file is generated assuming that each byte will be sent to the FPGA LSB-first. So near the beginning of the Intel-HEX file the synchronization pattern above is represented as the following 4 hex data bytes: "55 99 AA 66." An Intel-HEX file may be clearly detected by noting that each line of the file begins with a colon ':' character.

The Intel-HEX file contains much information that is not directly useful for a slave-serial implementation. The Xilinx toolset can also generate a raw binary ".bin" file containing the binary configuration bit-stream and nothing else. It is recommended to use this file format for slave-serial implementations. The contents of this file can be saved in the system-level ROM and used to initialize the FPGA in slave-serial mode.

Confusingly, the '.bin' file is formatted with the expectation that the MSB of each byte will be shifted out first—the opposite of the Intel-HEX file's convention. The synchronization pattern and the rest of the bit-stream are actually the same, but are represented in bit-reversed format in the .bin file. The same synchronization pattern in the .bin file, using the MSB-first convention, now looks like: "AA 99 55 66" To successfully download bit-stream data originating in a .bin file, each byte can be shifted out by MSB-first.

As an alternative feature, the JTAG interface of the FPGA can be used. The JTAG interface allows for access to debugging information within the FPGA and it is recommended that some sort of access (test points or header) to the JTAG interface be provided in case debugging is necessary in the future. If Master-serial configuration is used, provision of access to the JTAG interface of the bit-stream ROM is required to allow in-system reprogramming of the bit-stream ROM. The JTAG interfaces of the FPGA and bit-stream ROM (if present) as well as any other ICs on the board may of course be used for board-level testing as defined in the IEEE1149.1 standard.

The projection system with the configuration as discussed above can be built and ship to customers in many ways. As one example, one can receive a spatial light modulator and a control unit associated with the spatial light modulator for controlling the spatial light modulator. The spatial light modulator comprises an array of reflective micromirror devices capable of modulating light. The control unit is composed of a field-programmable-gate-array and lacks of an application-specific-integrated-circuit; and wherein the control unit comprises a data conversion module designated for converting a set of image data into a set of bitplane data. The module can be implemented in the field-programmable-gate-array through a set of configuration data such that the field-programmable-gate-array is capable to output the bitplane data to the spatial light modulator; and building a projection system using the received spatial light modulator and control unit, further comprising: modifying the set of data so as to modify the default configuration of the received control unit according to a desired specific configuration. Such built system can thus be delivered to an end user.

In another example of the invention, one can fabricate a spatial light modulator and a control unit associated with the spatial light modulator for controlling the spatial light modulator. The spatial light modulator comprises an array of reflective micromirror devices capable of modulating light. The control unit can be composed of a field-programmable-gate-array and lacks of an application-specific-integrated-circuit; and wherein the control unit comprises a data conversion module designated for converting a set of image data into a set of bitplane data, said module being implemented in the field-programmable-gate-array through a set of configuration data such that the field-programmable-gate-array is capable to output the bitplane data to the spatial light modulator. The fabricated spatial light modulator and control unit can be delivered to a customer for building a projection system, for example, by providing to the customer an access to the pre-programmed configuration so as to allow the customer to modify the field-programmable-gate-array.

In yet another example of the invention, a method may comprise the steps of: making a spatial light modulator and a control unit, said spatial light modulator comprising an array of reflective and deflectable micromirror devices; and said control unit comprising a set of programmable codes for controlling the spatial light modulator in an operation; and providing to a customer an access to the set of programmable codes such that the customer is capable of modifying the codes according a specific configuration; and delivering the spatial light modulator and the control unit to the customer.

It will be appreciated by those of ordinary skill in the art that a new and useful display system employing micromirror devices and FPGA has been described herein. In view of many possible embodiments to which the principles of this invention may be applied, however, it should be recognized that the embodiments described herein with respect to the drawing figures are meant to be illustrative only and should not be taken as limiting the scope of invention. For example, those of ordinary skill in the art will recognize that the illustrated embodiments can be modified in arrangement and detail without departing from the spirit of the invention. Therefore, the invention as described herein contemplates all such embodiments as may come within the scope of the following claims and equivalents thereof.

We claim:

1. A projection system, comprising:
   an illumination system providing light;
   a spatial light modulator comprising an array of reflective and deflectable mirror plates for modulating the light;
   a control unit composed of a field-programmable-gate-array for controlling the spatial light modulator in modulating the light, wherein an application-specific-integrated-circuit is absent from the control unit;
   a data conversion module designated for converting a set of image data into a set of bitplane data, said module being implemented in the field-programmable-gate-array through a set of configuration data such that the field-programmable-gate-array is capable to output the bitplane data to the spatial light modulator; and
   a projection lens for projecting the modulated light; and
   screen on which the modulated light is projected.

2. The system of claim 1, wherein the field-programmable-gate-array is a volatile field-programmable-gate-array that is connected to a non-volatile memory wherein a set of configuration data for configuring and initializing the field-programmable-gate-array is stored.

3. The system of claim 2, wherein the memory stored therein the set of configuration data is a flash memory.

4. The system of claim 3, wherein the bitplane data is capable of being directly used by the spatial light modulator for producing the desired image without modification.

5. The system of claim 1, wherein the field-programmable-gate-array is a non-volatile field-programmable-gate-array and stored therein is a set of data for configuring and initializing the field-programmable-gate-array at a time when the field-programmable-gate-array is turned ON or OFF.

6. The system of claim 1, wherein a center-to-center distance between adjacent mirror plates of the array is from 4.38 to 10.16 microns.

7. The system of claim 1, further comprising:
   an array of addressing electrodes associated with the mirror plates for electrostatically moving the mirror plates;
   an array of memory cells each of which is connected to an addressing electrode for storing a state of the addressing electrodes; and
   wherein the memory cells in a row of the memory cell array is connected to first and second wordlines for actuating the memory cells, and wherein the first and second wordlines connect different memory cells of the row.

8. The system of claim 7, wherein each wordline connects every other memory cell in the row of the memory cell array.

9. The system of claim 1, further comprising:
   means for directing a light beam modulated by one reflective mirror plate onto different locations on the screen.

10. The system of claim 9, wherein the means comprises a movable folding mirror disposed in a propagation path of the modulated light between the spatial light modulator and screen.

11. The system of claim 9, wherein the means comprises a birefringent crystal with a set of electrodes attached thereto so as to allow electric voltages be applied.

12. The system of claim 1, wherein the illumination system comprises a LED for providing the light.

13. The system of claim 12, wherein the LED is capable of providing white color.

14. The system of claim 1, wherein the illumination system comprises an array of LEDs of different characteristic spectrums.

15. The system of claim 14, wherein the LED array comprises LEDs capable of producing red, green, and blue colors.

16. The system of claim 15, wherein the LEDs of the different colors have different numbers.

17. The system of claim 14, wherein the illumination system further comprises: a fly-eye lens.

18. The system of claim 14, wherein a color wheel with a set of color segments is absent from the system.

19. The system of claim 1, further comprising: another spatial light modulator composed of an array of reflective and deflectable mirror plates.

20. The system of claim 19, wherein said another spatial light modulator and said modulator are enclosed within a space between a package lid and a package substrate.

21. The system of claim 1, wherein the illumination system comprises an arc lamp.

22. The system of claim 1, wherein a gap between adjacent reflective mirror plates is from 0.1 to 1 micron.

23. The system of claim 1 being a rear projection system.

24. The system of claim 1 being a front projection TV.

25. A projection system, comprising:
a light-emitting-diode (LED) providing light;
a spatial light modulator comprising an array of micromirror devices, each of which comprises a deflectable and reflective mirror plate associated with an addressing electrode for electrostatically moving the mirror plate;
a control unit composed of a field-programmable-gate-array configured so as to be able to control the spatial light modulator in an operation; and
an optical element for projecting the modulated light on a screen.

26. The system of claim 25, wherein the control unit comprises a data conversion module implemented in the field-programmable-gate-array through a set of configuration data such that a set of image data can be converted into a set of bitplane data by the field-programmable-gate-array.

27. The system of claim 25, wherein the field-programmable-gate-array is volatile; and wherein the control unit further comprises a memory stored therein a set of configuration data for configuring and initializing the field-programmable-gate-array when it is powered on.

28. The system of claim 25, wherein the field-programmable-gate-array is non-volatile.

29. The system of claim 25 being a rear-projector.

30. The system of claim 25 being a front-projector.

31. The system of claim 25, wherein a center-to-center distance between adjacent micromirror devices in the array is from 4.38 to 10.16 microns.

32. The system of claim 25, wherein a gap between adjacent micromirror devices is from 0.1 to 1 micron.

33. The system of claim 25, wherein an application-specific-integrated-circuit is absent from the control unit.

34. The system of claim 25, further comprising:
an array of addressing electrodes associated with the mirror plates for electrostatically moving the mirror plates;
an array of memory cells each of which is connected to an addressing electrode for storing a state of the addressing electrodes; and
wherein the memory cells in a row of the memory cell array is connected to first and second wordlines for actuating the memory cells, and wherein the first and second wordlines connect different memory cells of the row.

35. The system of claim 25, further comprising:
means for directing a light beam modulated by one reflective mirror plate onto different locations on the screen.

36. The system of claim 25, wherein the LED is capable of providing white color.

37. The system of claim 25, wherein the LED is a member of an array of LEDs of different characteristic spectrums.

38. The system of claim 37, wherein the LED array comprises LEDs capable of producing red, green, and blue colors.

39. The system of claim 25, wherein farther comprising: a fly-eye lens for directing the light from the LED to the spatial light modulator.

40. A projection system, comprising:
an illumination system providing light;
a reflective spatial light modulator on which light from the light source is incident, the spatial light modulator comprising,
means for modulating pixels of the spatial light modulator such that pixels in an ON state direct light as a first pixel pattern via projection optics onto a target, wherein the intensity vs. distance across a row of projected pixels on the target at a particular time T1, FWHM, defined as the fall width at half maximum of an intensity peak for a particular pixel, is less than 70% of the pitch, wherein the pitch is defined as the distance between adjacent intensity peaks;
a control unit composed of a field-programmable-gate-array implemented therein a plurality of fanctional modules for controlling the illumination system and array of micromirror devices; and
an optical element for projecting the modulated light on a screen.

41. The system of claim 40, wherein the control unit comprises a data conversion module implemented in the field-programmable-gate-array through a set of configuration data such that a set of image data can be converted into a set of bitplane data by the field-programmable-gate-array.

42. The system of claim 40, wherein the field-programmable-gate-array is volatile; and wherein the control unit further comprises a memory stored therein a set of configuration data for configuring and initializing the field-programmable-gate-array when it is powered on.

43. The system of claim 40, wherein the field-programmable-gate-array is non-volatile.

44. The system of claim 40 being a rear-projector.

45. The system of claim 40 being a front-projector.

46. The system of claim 40, wherein a center-to-center distance between adjacent micromirror devices in the array is from 4.38 to 10.16 microns.

47. The system of claim 40, wherein a gap between adjacent micromirror devices is from 0.1 to 1 micron.

48. The system of claim 40, wherein an application-specific-integrated-circuit is absent from the control unit.

49. The system of claim 40, further comprising:
an array of addressing electrodes associated with the mirror plates for electrostatically moving the mirror plates;
an array of memory cells each of which is connected to an addressing electrode for storing a state of the addressing electrodes; and wherein the memory cells in a row of the memory cell array is connected to first and second wordlines for actuating the memory cells, and wherein the first and second wordlines connect different memory cells of the row.

50. The system of claim 40, wherein the illumination system comprises a LED that is capable of providing white color.

51. The system of claim 50, wherein the illumination system comprises an array of LEDs of different characteristic spectrums.

52. The system of claim 51, wherein the LED array comprises LEDs capable of producing red, green, and blue colors.

53. A projection system, comprising:
an illumination system capable of producing light;
a spatial light modulator comprising an array of reflective and deflectable mirror plates for modulating the light based on a sequence of bitplane data that is derived from a desired image;
means for converting the desired image to the sequence of bitplane data with a programmed field-programmable-gate-array; and
a screen wherein the modulated light is projected so as to produce the desired image.

54. The system of claim 53, wherein the field-programmable-gate-array is a volatile field-programmable-gate-array that is connected to a non-volatile memory and stored therein is a set of data for configuring and initializing the field-programmable-gate-array.

55. The system of claim 53, wherein the field-programmable-gate-array is a non-volatile field-programmable-gate-array stored therein a set of data for configuring and initializing the field-programmable-gate-array at a time when the field-programmable-gate-array is turned ON or OFF.

56. The system of claim 53 being a front-projector.

57. The system of claim 53 a rear-projection TV.

58. The system of claim 53, wherein an application-specific-integrated-circuit is absent from the field-programmable-gate-array.

59. The system of claim 53, wherein the means comprises a data conversion module implemented in the field-programmable-gate-array through a set of configuration data.

60. A method for displaying a desired image with a spatial light modulator comprising an array of micromirror devices, comprising
directing light to the spatial light modulator;
deriving a sequence of bitplane data from the desired image using a pre-programmed field-programmable-gate-array;
modulating the light by the spatial light modulator according to the sequence of bitplane data; and
projecting the modulated light onto a screen.

61. A projection system, comprising:
an illumination system producing light;
a spatial light modulator optically coupled to the light for modulating the light;
a control unit for controlling the modulation of the spatial light modulator, wherein the control unit comprises a field-programmable-gate-array programmed such that an output of the field-programmable-gate-array comprises a set of bitplane data directly usable by the spatial light modulator for producing an image; and
a screen on which the modulated light is projected so as to form the desired image.

* * * * *